(12) United States Patent
Yang et al.

(10) Patent No.: US 11,916,881 B2
(45) Date of Patent: Feb. 27, 2024

(54) RULE DETECTION METHOD AND RELATED DEVICE

(71) Applicant: Huawei Technologies Co., Ltd., Shenzhen (CN)

(72) Inventors: Feiran Yang, Beijing (CN); Jian Zhang, Shenzhen (CN); Jing Hu, Beijing (CN); Zhengyi Zhang, Beijing (CN); Jun Gong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 17/471,414

(22) Filed: Sep. 10, 2021

(65) Prior Publication Data

US 2022/0086126 A1    Mar. 17, 2022

(30) Foreign Application Priority Data

Sep. 14, 2020    (CN) .......................... 202010962457.6

(51) Int. Cl.
*G06F 21/00* (2013.01)
*H04L 9/40* (2022.01)
*H04L 41/14* (2022.01)

(52) U.S. Cl.
CPC .......... *H04L 63/0263* (2013.01); *H04L 41/14* (2013.01); *H04L 63/0236* (2013.01); *H04L 63/0245* (2013.01); *H04L 63/101* (2013.01)

(58) Field of Classification Search
CPC . H04L 63/0263; H04L 41/14; H04L 63/0236; H04L 63/0245; H04L 63/101
See application file for complete search history.

(56) References Cited

U.S. PATENT DOCUMENTS 6,381,639 B1 * 4/2002 Thebaut ................ G06F 21/604
709/221
7,958,075 B1    6/2011 Applegate et al.
(Continued)

FOREIGN PATENT DOCUMENTS

CN    104092676 A * 10/2014
CN    106817275 A * 6/2017
(Continued)

OTHER PUBLICATIONS

Abedin, M. et al., "Detection and Resolution of Anomalies in Firewall Policy Rules," Data and Applications Security 2006, LNCS 4127, IFIP International Federation for Information Processing, 2006, 15 pages.

(Continued)

*Primary Examiner* — Michael M Lee
(74) *Attorney, Agent, or Firm* — SLATER MATSIL, LLP

(57) ABSTRACT

Embodiments of this application disclose a rule detection method, to increase rule anomaly detection coverage. The method in the embodiments of this application includes: determining, based on an obtained first initial priority corresponding to a first rule, an obtained second current priority corresponding to a second rule, and a determined inclusion relationship between the first rule and the second rule, a first current priority corresponding to the first rule; and then determining, based on a relationship between the first initial priority and the first current priority, whether an anomaly occurs on the first rule.

20 Claims, 8 Drawing Sheets

(56) References Cited

U.S. PATENT DOCUMENTS

| | | |
|---|---|---|
| 8,478,707 B1 | 7/2013 | Ong et al. |
| 2016/0112460 A1 | 4/2016 | Li et al. |
| 2019/0132250 A1* | 5/2019 | Horn .................. H04L 47/2483 |
| 2019/0207843 A1* | 7/2019 | Horn ....................... H04L 45/02 |

FOREIGN PATENT DOCUMENTS

| | | | | |
|---|---|---|---|---|
| CN | 108540427 A | | 9/2018 | |
| CN | 108881005 A | | 11/2018 | |
| EP | 2023567 A1 | * | 2/2009 | ......... H04L 63/0263 |
| JP | 2018147464 A | * | 9/2018 | ........... H04L 63/101 |

OTHER PUBLICATIONS

Al-Shaer, E.S. et al., "Discovery of Policy Anomalies in Distributed Firewalls," IEEE INFOCOM 2004, 12 pages.

Horn, A. et al., "A Precise and Expressive Lattice-Theoretical Framework for Efficient Network Verification," IEEE, Aug. 24, 2019, 16 pages.

Yang, H. et al., "Real-Time Verification of Network Properties using Atomic Predicates," 2013 IEEE, 11 pages.

Zhang, P. et al., "APKeep: Realtime Verification for Real Networks," usenix, The Advanced Computing Systems Association, This paper is included in the Proceedings of the 17th USENIX Symposium on Networked Systems Design and Implementation (NSDI 20), Santa Clara, Ca, USA, Feb. 25-27, 2020, 17 pages.

* cited by examiner

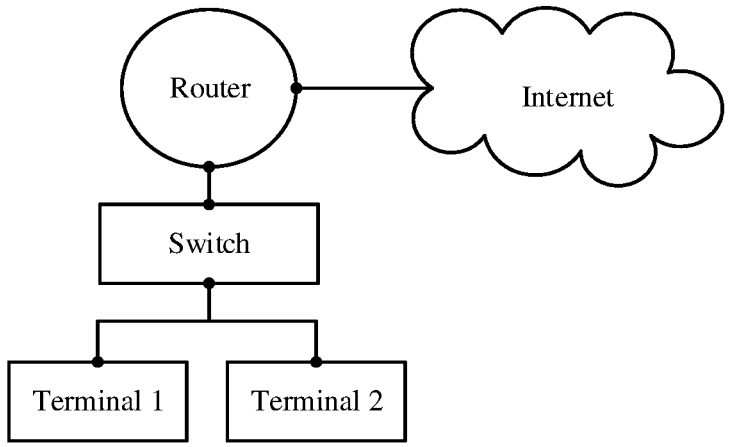

Algorithm 2: InsertNode: find where new node need to be inserted into the lattice 1 Function InsertNode(node, parent);
   Input : A inserted node and the current position
2 for $child \in paranet.Child$ do
3    if $child.Range \subset node.Range$ then
4       parent.Child.Remove(Child);
5       node.Child.Add(Child);
6       ModifiedList.Add(parent);
7    else if $range \leftarrow node.Range \cap child.Range \neq 0$ then
8       ModifiedList.Add(child);
9       tempNode $\leftarrow$ Find(range);
10      if $tempNode = null$ then
11          tempNode.vertexPriority $\leftarrow$ min(node.vertexPriority, child.vertexPriority);
12          tempNode.Cardinality $\leftarrow$ |tempNode.Range|;
13          priList[tempNode.vertexPriority].Cardinality += tempNode.Cardinality;
14          InsertNode(tempNode, child);
15       InsertNode(tempNode, node);
16    else if $node.Range \subset child.Range$ then
17       return InsertNode(node, child);
18 parent.Child.Add(node);
19 if $parent.vertexPriority < node.vertexPriority$ then
20    priList[node.vertexPriority] −= node.Cardinality;
21    priList[parent.vertexPriority] += node.Cardinality;
22    node.vertexPriority $\leftarrow$ parent.vertexPriority;
23 UpdateChild(node);

FIG. 2

RULE DETECTION METHOD AND RELATED DEVICE

CROSS-REFERENCE TO RELATED APPLICATIONS

This application claims priority to Chinese Patent Application No. 202010962457.6, filed on Sep. 14, 2020, which is hereby incorporated by reference in its entirety.

TECHNICAL FIELD

Embodiments of this application relate to the data processing field, and in particular, to a rule detection method and a related device.

BACKGROUND

With rapid development of networks, complexity of global networks is increasing, and network security requirements and complexity are also greatly increasing. Configuring an access control list (ACL) plays an important role in network configuration. The ACL is used to identify packets that need to be forwarded or directly shielded. A large quantity of rules are configured in the ACL. Each rule has a corresponding priority, corresponding packet space, and a corresponding forwarding action. When a packet arrives at a device and the ACL is actually used, a processor performs traversing from a rule with a highest priority to a rule with a low priority. The device uses a rule that has a highest priority and that matches the packet. During actual application, configuration of the ACL may cause various anomalies, and consequently the actually used rule does not reflect a real intention of a user or a network administrator. In this case, the device may receive a packet that should not be received, in other words, receive an attack, or discard a packet that should not be discarded. Consequently, information is lost. To prevent the anomalies caused in configuration of the ACL, anomaly detection needs to be performed on the configured ACL, so that the user or the network administrator can adjust a rule in the ACL based on an anomaly detection result.

A theoretical rule detection method aims to create, by using a packet equivalence class (PEC) algorithm, a Hasse diagram constructed based on a PEC inclusion relationship, store a node corresponding to a rule in the ACL into the Hasse diagram, and detect an anomaly by identifying a quantity of packet space elements actually included by the node.

The PEC algorithm provides only a theoretical framework and can detect only a limited quantity of types of anomalies between rules in the ACL.

SUMMARY

Embodiments of this application provide a rule detection method and a related device, to increase rule anomaly detection coverage.

A first aspect of the embodiments of this application provides a rule detection method, including the following.

After obtaining a first initial priority corresponding to a first rule, a second current priority corresponding to a second rule, and an inclusion relationship between the first rule and the second rule, a first current priority corresponding to the first rule is determined based on the first initial priority, the second current priority, and the inclusion relationship. The first initial priority indicates a priority corresponding to the first rule configured in an ACL. The second current priority is a priority used by the second rule at a current moment, and the second current priority may be the same as or different from a second initial priority. The inclusion relationship between the first rule and the second rule indicates inclusion between initial packet space ranges corresponding to the rules. For example, a source address corresponding to a rule 1 is 100.0.1.0/25, and a destination address corresponding to the rule 1 is 0.0.0.0/2, and a source address corresponding to a rule 2 is 100.0.1.0/24, and a destination address corresponding to the rule 2 is 0.0.0.0/0. Initial packet space ranges corresponding to the rule 1 and the rule 2 each include the source address and the destination address. The source address and the destination address corresponding to the rule 2 respectively include the source address and the destination address corresponding to the rule 1. Therefore, the initial packet space range corresponding to the rule 2 includes the initial packet space range corresponding to the rule 1. In other words, the rule 2 includes the rule 1. After the first current priority is determined, whether an anomaly occurs between the first rule and another rule may be determined based on a relationship between the first current priority and the first initial priority.

In this embodiment of this application, rule priority transfer is introduced in rule anomaly detection. This can be actually used to detect various rule anomalies in the ACL, and increase coverage in anomaly identification.

With reference to the first aspect of the embodiments of this application, in a first implementation of the first aspect of the embodiments of this application, the inclusion relationship between the first rule and the second rule may be determined based on initial packet space ranges. Each rule has an initial packet space range corresponding to the rule. The initial packet space range includes a value range of each feature, and the feature may be at least one of a source address, a destination address, a source port number, or a destination port number corresponding to the rule. The first rule corresponds to a first initial packet space range, and the second rule corresponds to a second initial packet space range. If the second initial packet space range includes the first initial packet space range, it may be determined that the second rule includes the first rule. Inclusion of an initial packet space range means that a value range of each feature is included.

If the second rule includes the first rule, it may be determined that in a Hasse diagram data structure, a second node corresponding to the second rule is an ancestor node of a first node corresponding to the first rule. The ancestor node may be a parent node, a grandfather node, or the like. This may be determined based on a specific case.

In this embodiment of this application, an inclusion relationship between different rules and a location relationship between nodes that correspond to the rules and that are in a Hasse diagram may be determined based on initial packet space ranges corresponding to the rules. This improves feasibility of the solution.

With reference to the first aspect of the embodiments of this application, in a second implementation of the first aspect of the embodiments of this application, the first initial priority may be compared with the second current priority, to determine the first current priority, and the second node is a node with a highest current priority in at least one parent node of the first node. If the second current priority is higher than the first initial priority, priority transfer occurs, and a current priority of the first node is changed to be the same as the second current priority. If the second current priority is lower than the first initial priority, a current priority of the first node is changed to be the same as the first initial priority.

In this embodiment of this application, the first initial priority may be compared with the second current priority corresponding to the node with the highest current priority in the at least one parent node of the first node, to determine the first current priority. This comparison manner is simple.

With reference to the first implementation or the second implementation of the first aspect, in a third implementation of the first aspect of the embodiments of this application, after the first current priority is determined, a first target value may be further determined based on a first target node. The first target node is a node whose current priority is the same as the first initial priority. The first target value is a sum of packet space sizes corresponding to the first target node, and the packet space sizes corresponding to the first target node represent a quantity of non-overlapping elements between the first target node and a descendant node of the first target node.

After the first target value is determined, whether an anomaly occurs on the first rule may be determined based on the first initial priority, the first current priority, and the first target value. When the first target value is 0, if the first initial priority is the same as the first current priority, it may be determined that an anomaly occurs between the first rule and a third rule corresponding to an ancestor node of the first node, or if the first initial priority is different from the first current priority, it may be determined that an anomaly occurs between the first rule and a fourth rule corresponding to a descendant node of the first node.

In this embodiment of this application, after the first target value is determined, and a relationship between the first initial priority and the first current priority is determined through comparison, a specific rule on which an anomaly occurs is further determined, where the anomaly occurs between the specific rule and the first rule. In this way, a specific type of the anomaly is further clarified.

With reference to the third implementation of the first aspect, in a fourth implementation of the first aspect of the embodiments of this application, a first forwarding action may be compared with a second forwarding action, to determine a specific anomaly between the first rule and the third rule. The first forwarding action is an operation instruction corresponding to the first rule, and the second forwarding action is an operation instruction corresponding to the third rule. It should be noted that a current priority corresponding to the third rule is the same as the second current priority. Based on the third implementation of the first aspect, if the first forwarding action is the same as the second forwarding action, it may be determined that a first-type redundancy anomaly occurs between the first rule and the third rule, or if the first forwarding action is different from the second forwarding action, it may be determined that a shielding anomaly occurs between the first rule and the third rule.

In this embodiment of this application, a specific type of an anomaly between the rules is further determined with reference to the forwarding actions between the rules, so that the solution can be applied to a plurality of scenarios. This enhances flexibility of the solution.

With reference to the third implementation of the first aspect, in a fifth implementation of the first aspect of the embodiments of this application, the fourth rule may be determined based on a descendant node of the first node, and a fourth node corresponding to the fourth rule is a node whose current priority is higher than the first current priority in a descendant node of the first node. After the fourth rule is determined, it may be determined that a multi-rule shielding anomaly occurs between the first rule and the fourth rule.

In this embodiment of this application, when it is determined that the first target value is 0, and that the first initial priority is the same as the first current priority, the fourth rule may be determined based on the fourth node, where the multi-rule shielding anomaly occurs between the fourth rule and the first rule. In this way, a type of an anomaly is further clarified, and accuracy of the solution for rule anomaly detection is improved.

With reference to any one of the second implementation to the fifth implementation of the first aspect, in a sixth implementation of the first aspect of the embodiments of this application, the first target value is obtained in a manner of a priority list, where the priority list includes K initial priorities, K target values, and K nodes, and is used to indicate a one-to-one correspondence between an initial priority, a target value, and a node, and K is an integer greater than or equal to 1.

With reference to the sixth implementation of the first aspect, in a seventh implementation of the first aspect of the embodiments of this application, before the first target value is determined, a fifth node may be added to the Hasse diagram. In this case, the priority list is updated. A specific location of the fifth node may be determined based on an initial packet space range corresponding to the fifth node, and a second target value corresponding to a second target node may be further determined. The second target node is a node whose current priority is the same as a fifth initial priority. Addition of the fifth node may affect a current priority or a target value corresponding to another node. It should be noted that an $n^{th}$ target value is determined based on a sum of packet space sizes corresponding to all nodes whose current priorities are n. The second target value is stored in a to-be-updated priority list. If another target value is changed, a changed result is stored in the to-be-updated priority list, and an updated priority list is finally determined.

In this embodiment of this application, addition of a new node causes a change in the priority list. In this way, the priority list can be updated in a timely manner, and rule detection is more accurate.

With reference to any one of the first aspect or the first implementation to the seventh implementation of the first aspect, in an eighth implementation of the first aspect of the embodiments of this application, after an anomaly between the rules is detected, an alarm may be sent to a user or a network administrator, to notify the user or the network administrator to pay attention to the anomaly. The alarm may be represented in a form of a text or voice, provided that the alarm can attract an attention of the user or the network administrator.

In this embodiment of this application, after the anomaly is determined, the alarm is sent to the user or the network administrator to notify anomaly information. This meets an actual use requirement better, and improves feasibility of the solution.

A second aspect of the embodiments of this application provides a rule detection method, including obtaining, in a Hasse diagram data structure, an initial priority of a child node and an initial priority of a parent node, and determining, by comparing the initial priority of the child node with the initial priority of the parent node, whether an anomaly occurs between rules corresponding to the child node and the parent node.

With reference to the second aspect, in a first implementation of the second aspect of the embodiments of this application, if the initial priority of the child node is higher than the initial priority of the parent node, it may be determined that an anomaly occurs between the rules corresponding to the child node and the parent node.

In this embodiment of this application, whether the anomaly occurs between the rules corresponding to the child node and the parent node is determined by comparing the initial priority of the child node with the initial priority of the parent node. A comparison manner is simple and convenient.

With reference to the first implementation of the second aspect, in a second implementation of the second aspect of the embodiments of this application, a specific type of the anomaly that occurs between the rules corresponding to the child node and the parent node may be further determined based on a forwarding action corresponding to the child node and a forwarding action corresponding to the parent node. If the forwarding action corresponding to the child node is the same as the forwarding action corresponding to the parent node, it may be determined that a second-type redundancy anomaly occurs between the rules corresponding to the child node and the parent node. If the forwarding action corresponding to the child node is different from the forwarding action corresponding to the parent node, it may be determined that a generalization anomaly occurs between the rules corresponding to the child node and the parent node.

In this embodiment of this application, a specific anomaly case that occurs between the rules corresponding to the child node and the parent node is further determined based on the forwarding action corresponding to the child node and the forwarding action corresponding to the parent node. In this way, a detection result is more accurate.

With reference to any one of the second aspect or the first implementation and the second implementation of the second aspect, in a third implementation of the second aspect of the embodiments of this application, after an anomaly between the rules is detected, an alarm may be sent to a user or a network administrator, to notify the user or the network administrator to pay attention to the anomaly. The alarm may be represented in a form of a text or voice, provided that the alarm can attract an attention of the user or the network administrator.

In this embodiment of this application, after the anomaly is determined, the alarm is sent to the user or the network administrator to notify anomaly information. This meets an actual use requirement better, and improves feasibility of the solution.

A third aspect of the embodiments of this application provides a rule detection method, including the following.

Whether a correlation anomaly occurs between the two rules is determined by comparing whether two rules intersect with each other. Intersection between the rules means that initial packet space ranges corresponding to the two rules partially overlap. If the two rules intersect with each other, it may be determined that a correlation anomaly occurs between the two rules.

In this embodiment of this application, after it is determined that the two rules intersect with each other, it can be determined that the correlation anomaly occurs between the two rules. A comparison manner is simple, and flexibility of the solution is improved.

With reference to the third aspect, in a first implementation of the third aspect of the embodiments of this application, after an anomaly between the rules is detected, an alarm may be sent to a user or a network administrator, to notify the user or the network administrator to pay attention to the anomaly. The alarm may be represented in a form of a text or voice, provided that the alarm can attract an attention of the user or the network administrator.

In this embodiment of this application, after the anomaly is determined, the alarm is sent to the user or the network administrator to notify anomaly information. This meets an actual use requirement better, and improves feasibility of the solution.

A fourth aspect of the embodiments of this application provides a rule detection apparatus, including an obtaining unit, configured to obtain a first initial priority corresponding to a first rule, and obtain a second current priority corresponding to a second rule, and a determining unit, configured to determine, based on the first initial priority, the second current priority, and an inclusion relationship between the first rule and the second rule, a first current priority corresponding to the first rule, and determine, based on the first initial priority and the first current priority, whether an anomaly occurs on the first rule.

The rule detection apparatus is configured to perform the method in the first aspect.

A fifth aspect of the embodiments of this application provides a rule detection apparatus, including an obtaining unit, configured to obtain a first initial priority corresponding to a first rule, where the first rule corresponds to a first node in a Hasse diagram data structure, and the first initial priority is stored in the first node, and obtain a second initial priority corresponding to a second node, where the second node is a parent node of the first node in the Hasse diagram data structure, and a determining unit, configured to determine, based on the first initial priority and the second initial priority, whether an anomaly occurs between the first rule and the second rule.

The rule detection apparatus is configured to perform the method in the second aspect.

A sixth aspect of the embodiments of this application provides a rule detection apparatus, including an obtaining unit, configured to obtain a first initial packet space range corresponding to a first rule, and obtain a second initial packet space range corresponding to a second rule, and a determining unit, configured to determine, based on the first initial packet space range and the second initial packet space range, whether an anomaly occurs between the first rule and the second rule, and if the first initial packet space range intersects with the second initial packet space range, determine that a correlation anomaly occurs between the first rule and the second rule.

The rule detection apparatus is configured to perform the method in the third aspect.

A seventh aspect of the embodiments of this application provides a computer device, including a processor, a memory, an input/output device, and a bus, where the processor, the memory, and the input/output device are connected to the bus, and the processor is configured to perform the following steps, including obtaining a first initial priority corresponding to a first rule, and obtaining a second current priority corresponding to a second rule, then determining, based on the first initial priority, the second current priority, and an inclusion relationship between the first rule and the second rule, a first current priority corresponding to the first rule, and determining, based on the first initial priority and the first current priority, whether an anomaly occurs on the first rule.

The computer device is configured to perform the method in the first aspect.

An eighth aspect of the embodiments of this application provides a computer device, including a processor, a memory, an input/output device, and a bus, where the processor, the memory, and the input/output device are connected to the bus, and the processor is configured to perform the following steps, including obtaining a first initial priority corresponding to a first rule, where the first rule corresponds to a first node in a Hasse diagram data structure, and the first initial priority is stored in the first node, and obtaining a second initial priority corresponding to a second node, where the second node is a parent node of the first node in the Hasse diagram data structure, and determining, based on the first initial priority and the second initial priority, whether an anomaly occurs between the first rule and the second rule.

The rule detection apparatus is configured to perform the method in the second aspect.

A ninth aspect of the embodiments of this application provides a computer device, including a processor, a memory, an input/output device, and a bus, where the processor, the memory, and the input/output device are connected to the bus, and the processor is configured to perform the following steps, including obtaining a first initial packet space range corresponding to a first rule, and obtaining a second initial packet space range corresponding to a second rule, and determining, based on the first initial packet space range and the second initial packet space range, whether an anomaly occurs between the first rule and the second rule.

The rule detection apparatus is configured to perform the method in the third aspect.

A tenth aspect of the embodiments of this application provides a computer-readable storage medium. The computer-readable storage medium stores a program. When executing the program, the computer performs the methods in the first aspect, the second aspect, and the third aspect.

An eleventh aspect of the embodiments of this application provides a computer program product. When the computer program product is executed on a computer, the computer performs the methods in the first aspect, the second aspect, and the third aspect.

BRIEF DESCRIPTION OF THE DRAWINGS

FIG. 1 is a schematic diagram of an application architecture of an ACL in embodiments of this application;

FIG. 2 is a schematic diagram of a pseudocode in embodiments of this application;

DETAILED DESCRIPTION OF ILLUSTRATIVE EMBODIMENTS

Figure 3A:
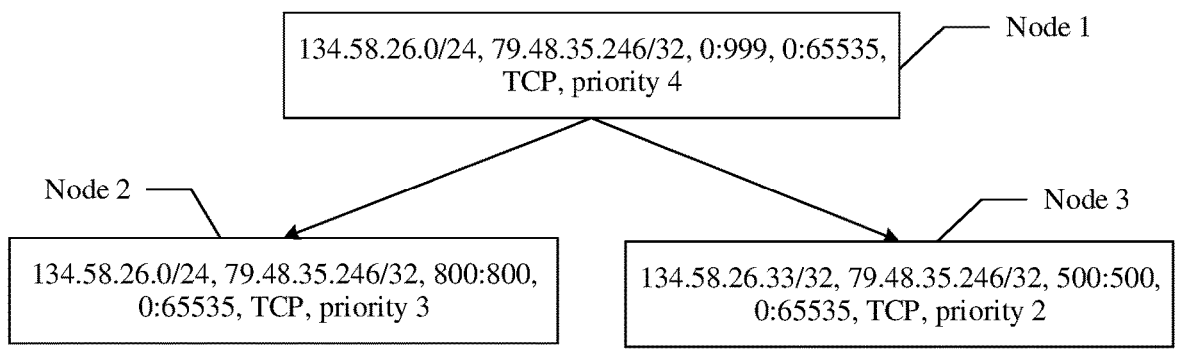
FIG. 3a is a schematic diagram of a Hasse diagram data structure in embodiments of this application.

The embodiments of this application provide a rule detection method, to increase rule anomaly detection coverage.

An ACL is a packet filtering-based access control technology in which a data packet on an interface can be filtered based on a specified condition and the packet is allowed to pass or discarded, to improve network security. The ACL may be applied to an architecture shown in FIG. 1.

The ACL may be configured in a plurality of network elements, may be applied to a router and a switch shown in FIG. 1, or may be applied to a firewall. This is not specifically limited herein. The router and the switch are merely used as examples in the embodiments of this application.

At least one rule is configured in the ACL. These rules are used to describe matching conditions of packets. Each rule has a corresponding priority, a corresponding packet space, and a corresponding forwarding action. The rules configured in the ACL may be shown in the following Table 1. It should be noted that these matching conditions may be a source address and a destination address of a packet, or may be a source address, a destination address, a source port number, a destination port number, a used protocol, and the like. The addresses in Table 1 are all in a mask form. Table 1 merely shows an example of rule configuration in the ACL, and a source address and a destination address are used for description. During actual application, configuration may be performed based on an actual requirement. This is not specifically limited herein.

TABLE 1

| Serial number | Priority | Source address | Destination address | Forwarding action |
| --- | --- | --- | --- | --- |
| 1 | 1 | 100.0.0.0/24 | 0.0.0.0/0 | Forward |
| 2 | 2 | 0.0.0.0/0 | 200.0.0.0/24 | Reject |
| 3 | 3 | 100.0.1.0/24 | 0.0.0.0/2 | Forward |
| 4 | 4 | 100.0.0.0/25 | 0.0.0.0/0 | Reject |
| 5 | 5 | 100.0.1.0/25 | 0.0.0.0/2 | Forward |
| 6 | 6 | 100.0.1.0/24 | 0.0.0.0/0 | Forward |
| 7 | 7 | 100.0.0.0/23 | 0.0.0.0/0 | Reject |
| 8 | 8 | 0.0.0.0/0 | 200.0.0.0/16 | Forward |

When the ACL is used to process a packet, traversing is performed from a rule with a highest priority to a rule with a low priority, and a device uses a rule that has a highest priority and that matches the packet, and performs a forwarding action corresponding to the rule. In the embodiments of this application, a smaller value indicates a higher priority. During actual application, the priority may alternatively be represented in another form. For example, a larger value indicates a higher priority. Alternatively, 26 English letters are used to indicate priorities, and the priorities gradually decreases from "A" to "Z". This is not specifically limited herein. During actual application, configuration of the ACL may cause various anomalies, and consequently an action that is finally executed does not reflect a real intention of a user or a network administrator. A rule in the ACL includes the following anomaly cases.

1. Shielding anomaly: This anomaly means that a rule with a higher priority includes a rule with a lower priority, in other words, a packet space range corresponding to a rule with a higher priority covers a packet space range corresponding to a rule with a lower priority, and forwarding actions corresponding to the two rules are different, for example, a rule 1 and a rule 4 in Table 1. A packet space range includes a value range of a plurality of features, and coverage of the packet space range means that each dimension is covered. As shown in Table 1, a source address and a destination address corresponding to the rule 4 are respectively covered by a source address and a destination address corresponding to the rule 1. Therefore, the packet space range corresponding to the rule 4 is completely included in the packet space range corresponding to the rule 1, and a packet that matches the rule 4 also matches the rule 1. The priority corresponding to the rule 1 is higher than the priority corresponding to the rule 4. Therefore, the rule 4 is not enabled. In this case, a real intention of a user may not be implemented. When the shielding anomaly occurs, there is a rule that is not actually used. Therefore, the shielding anomaly belongs to a serious error type.

2. First-type redundancy anomaly: This anomaly is similar to a shielding anomaly. To be specific, a rule with a higher priority includes a rule with a lower priority, and forwarding actions corresponding to the two rules are the same, for example, a rule 3 and a rule 5 in Table 1. The rule 5 is redundant because there is the rule 3. The rule 3 has a higher priority, and therefore, the rule 5 is not enabled. However, because the two rules correspond to the same forwarding action, additional space is occupied, and time is wasted during rule searching. When the first-type redundancy anomaly occurs, there is a rule that is not actually used. Therefore, like the shielding anomaly, the first-type redundancy anomaly also belongs to a serious error type.

3. Multi-rule shielding anomaly: This anomaly occurs when a rule is included by a plurality of other rules. A packet space range corresponding to a rule with a lower priority is completely covered by packet space ranges corresponding to a plurality of rules with higher priorities, for example, a rule 1, a rule 6, and a rule 7 in Table 1. A packet space range corresponding to the rule 7 is completely covered by a packet space range corresponding to the rule 1 and a packet space range corresponding to the rule 6, and the rule 7 has the lowest priority. Therefore, the rule 7 is not enabled. When the multi-rule shielding anomaly occurs, there is a rule that is not actually used. Therefore, like a shielding anomaly and a first-type redundancy anomaly, the multi-rule shielding anomaly also belongs to a serious error type.

4. Generalization anomaly: This anomaly means that a rule with a lower priority includes a rule with a higher priority and forwarding actions corresponding to the two rules are different, for example, a rule 2 and a rule 8 in Table 1. When a packet matches a packet space range corresponding to the rule 2, a device performs an action corresponding to the rule 2. When a packet matches a packet space range that corresponds to the rule 8 but does not fall within the packet space range corresponding to the rule 2, the device performs an action corresponding to the rule 8. When the generalization anomaly occurs, each rule is used. Therefore, the generalization anomaly does not belong to a serious error type. However, it should be noted that a user needs to determine whether the rule 2 is a special case of the rule 8 and needs to set a new rule alone to reflect a security policy.

5. Second-type redundancy anomaly: This anomaly means that a rule with a lower priority includes a rule with a higher priority, forwarding actions corresponding to the two rules are the same, and there is no rule that corresponds to a forwarding action different from the forwarding action corresponding to the two rules and that corresponds to space and a priority that are respectively located between space and between priorities corresponding to the two rules, for example, a rule 3 and a rule 6 in Table 1. In the ACL list shown in Table 1, because a packet space range corresponding to the rule 3 is completely covered by a packet space range corresponding to the rule 6, and forwarding actions corresponding to the two rules are the same, the rule 3 in the ACL shown in Table 1 can be deleted. However, if there is a rule 9 between the rule 3 and the rule 6, and for the rule 9, a priority is 4, a source address is 100.0.1.0/24, a destination address is 0.0.0.0/1, and a forwarding action is reject, after the rule 3 is deleted, the forwarding action corresponding to the rule 9 is actually performed on a packet corresponding to the rule 3. In this case, the rule 3 is no longer a rule that can be deleted. Therefore, the second-type redundancy anomaly requires higher caution.

6. Correlation anomaly: This anomaly means that packet space ranges corresponding to two rules intersect with each other and forwarding actions corresponding to the two rules are different, for example, a rule 1 and a rule 2 in Table 1. The correlation anomaly is common in configuration of the ACL, and requires great caution. If priorities corresponding to the two rules are interchanged, forwarding actions for some packets are changed. For example, a packet from 100.0.0.0 to 200.0.0.0 is changed from "forward" to "reject" if priorities corresponding to the rule 1 and the rule 2 are interchanged.

In the embodiments of this application, rule anomaly detection may be implemented by using a pseudocode shown in FIG. 2. The following briefly describes the pseudocode shown in FIG. 2.

Lines 2 to 17 of the pseudocode shown in FIG. 2 may be used to determine a location of a node that is newly added to a Hasse diagram data structure, and used to determine whether an intersection node is generated between the newly added node and an existing node in the Hasse diagram data structure. If the intersection node is generated, a location of the intersection node in the Hasse diagram data structure may be determined.

Lines 19 to 22 of the pseudo code shown in FIG. 2 may be used to update a current priority of the newly added node in a timely manner. If the current priority of the newly added node affects a priority of a child node of the newly added node, line 23 of the pseudo code is started, that is, the priority of the child node of the newly added node is updated.

It should be noted that the pseudocode shown in FIG. 2 is merely an implementation in the embodiments of this application, and reflects a logic procedure in the embodiments of this application. During actual application, a specific code form is to be optimized to some extent based on the pseudocode, so that an actually used code meets an actual application requirement better. This is not specifically limited herein.

In the embodiments of this application, rules in an ACL are placed in a Hasse diagram data structure, to detect various anomalies between the rules in the ACL. FIG. 3a is a schematic diagram of a Hasse diagram data structure in the embodiments of this application.

There are three rules shown in the following Table 2. The three rules are added to the Hasse diagram data structure, and the schematic diagram shown in FIG. 3a is obtained. A transmission protocol used by the rule may be a transmission control protocol (TCP), a user datagram protocol (UDP), or an internet control message protocol (ICMP). This is not specifically limited herein. The TCP protocol is used as an example in this embodiment of this application.

TABLE 2

| Serial number | Priority | Source address | Destination address | Source port number | Destination port number | Protocol | Forwarding action |
|---|---|---|---|---|---|---|---|
| 1 | 4 | 134.58.26.0/24 | 79.48.35.246/32 | 0:999 | 0:65535 | TCP | Shield |
| 2 | 3 | 134.58.26.0/24 | 79.48.35.246/32 | 800:800 | 0:65535 | TCP | Forward |
| 3 | 2 | 134.58.26.33/32 | 79.48.35.246/32 | 500:500 | 0:65535 | TCP | Forward |

Three nodes in FIG. 3a respectively correspond to the three rules in Table 2. For example, a node 1 corresponds to the rule 1. There is no necessary sequence for adding the rules to the Hasse diagram data structure. However, it should be noted that regardless of a case in which a complete ACL is read to output various anomalies or a case in which a single rule is added to an existing ACL to detect whether an anomaly occurs on the rule, a manner is that the rules are added to the entire data structure one by one. The rules in Table 2 as used as an example. The rule 1 may be added first, then the rule 3 may be added, and the rule 2 may be finally added. Alternatively, the rule 3 may be added first, then the rule 2 may be added, and the rule 1 may be finally added. A specific addition sequence is selected based on an actual application requirement. This is not specifically limited herein.

In this embodiment of this application, a sequence that the rule 2 is added first, then the rule 1 is added, and the rule 3 is finally added is merely used as an example. When the rule 1 is added, it needs to be determined whether there is an inclusion relationship between the rule 1 and the rule 2. If the rule 2 includes the rule 1, the node 1 is a child node of a node 2 in the Hasse diagram. It can be learned, through comparison between source addresses, destination addresses, source port numbers, and destination port numbers corresponding to the rule 1 and the rule 2, that a packet space range corresponding to the rule 1 completely covers a packet space range corresponding to the rule 2. Therefore, the node 1 is a parent node of the node 2 in the Hasse diagram. When the rule 3 is added to the Hasse diagram, traversing needs to be performed from a root node, namely, the node 1, to determine a location of a node 3. A finally obtained Hasse diagram is shown in FIG. 3a.

In a process of adding a rule to the Hasse diagram, a target value corresponding to an initial priority is changed. A priority list shown in the following Table 3 is independently created in the data structure, and an initial priority is used as an index to indicate a target value corresponding to each initial priority.

TABLE 3

| Priority | Target value |
|---|---|
| 2 | 65536 |
| 3 | 16777216 |
| 4 | 16760373248 |

The target value indicates a sum of packet space sizes corresponding to all rules whose current priorities are n (n is a positive integer greater than or equal to 1). A target value corresponding to a priority of 4 in Table 3 is used as an example. Because only the rule 1 has a current priority of 4, the target value is a packet space size corresponding to the rule 1. A calculation method is as follows. An initial packet space size corresponding to the rule 2 and an initial packet space size corresponding to the rule 3 are subtracted from an initial packet space size corresponding to the rule 1. The initial packet space size corresponding to the rule 1 is $2^{(32-24)} \times 2^{(32-32)} \times 1000 \times 65536 = 16777216000$, the initial packet space size corresponding to the rule 2 is $2^{(32-24)} \times 2^{(32-32)} \times 1 \times 65536 = 16777216$, and the initial packet space size corresponding to the rule 3 is $2^{(32-32)} \times 2^{(32-32)} \times 1 \times 65536 = 65536$. Therefore, the target value corresponding to the priority of 4 is 16777216000−16777216−65536=16760373248.

In this embodiment of this application, the rule 1 with a lower priority includes the rule 2 with a higher priority and the rule 3 with a higher priority, a forwarding action corresponding to the rule 1 is the same as a forwarding action corresponding to the rule 2, and the forwarding action corresponding to the rule 1 is different from the forwarding action corresponding to the rule 3. Therefore, a second-type redundancy anomaly occurs between the rule 1 and the rule 2, and a generalization anomaly occurs between the rule 1 and the rule 3. After an anomaly is detected, a processor may send an alarm to remind a user.

Figure 3B:
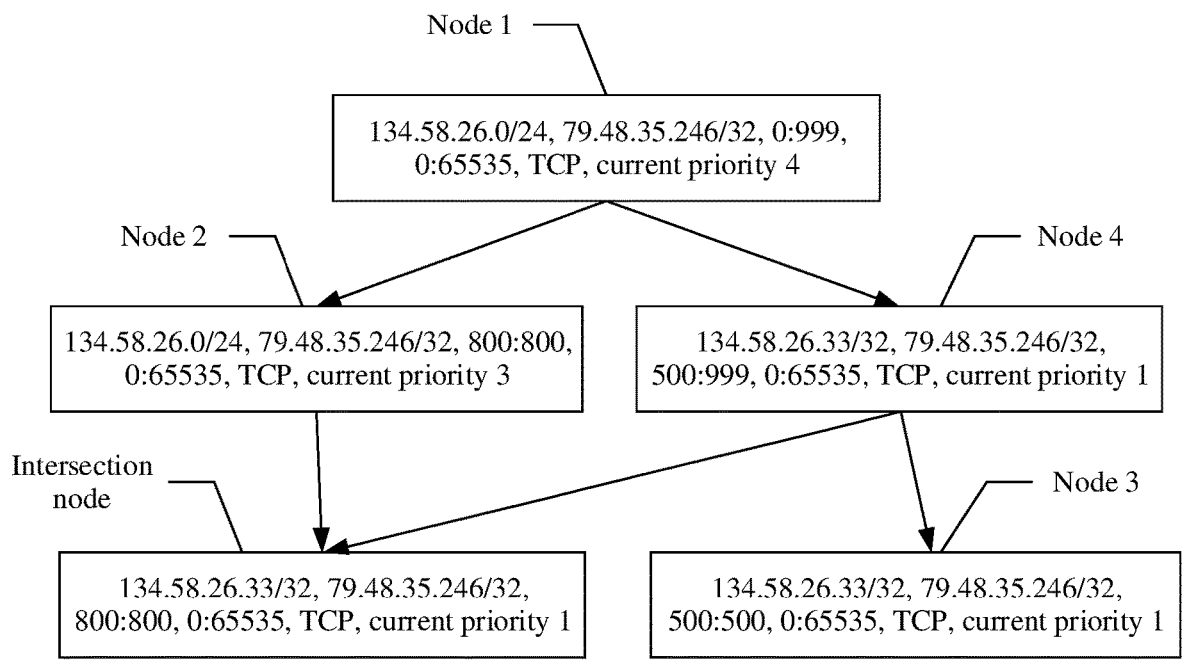
FIG. 3b is a schematic diagram of an updated Hasse diagram data structure in embodiments of this application.

When a new rule is added to the Hasse diagram, traversing is performed for the new rule from the root node, until a correct location is found, and a node corresponding to the new rule is added to the Hasse diagram. Addition of the new node may cause changes in a priority corresponding to another node and a current packet space size corresponding to the node, and further cause a change in the target value. FIG. 3b is a schematic diagram of an updated Hasse diagram data structure in the embodiments of this application.

Addition of a rule 4 is used as an example. For the rule 4, a priority is 1, a source address is 134.58.26.33/32, a destination address is 78.48.350.246/32, a source port number is 500:999, a destination port number is 0:65535, a used protocol is TCP, and a forwarding action is shield. A node 4 corresponding to the rule 4 is first compared with a root node. A rule 1 includes the rule 4, and therefore the node 4 is a descendant node of a node 1. The rule 4 is separately compared with a rule 2 and a rule 3. The rule 2 and the rule 4 have no inclusion relationship, and the rule 4 includes the rule 3. Therefore, it is determined that the node 4 is a parent node of a node 3, and an intersection node is generated between the node 4 and a node 2.

Addition of the node 4 causes transfer of a node priority and a change in a target value in a priority list. A finally obtained Hasse diagram is shown in FIG. 3b, and a priority list is shown in Table 4.

TABLE 4

| Priority | Target value |
|---|---|
| 1 | 32768000 |
| 2 | 0 |
| 3 | 16711680 |
| 4 | 16727736320 |

As shown in FIG. 3b, although the node 1 is a parent node of the node 4, an initial priority of the node 4 is higher than a current priority of the node 1. Therefore, a current priority of the node 4 is the same as the initial priority of the node 4, that is, 1. The node 4 is a parent node of the node 3, and the current priority of the node 4 is higher than an initial priority of the node 3. Therefore, a priority of the node 3 is updated to a priority of the node 4. To be specific, a current priority of the node 3 is the same as the current priority of the node 4, that is, 1. The intersection node is generated between the node 2 and the node 4, and a packet space range corresponding to the intersection node is a packet space range jointly covered by the node 2 and the node 4. The intersection node actually has no corresponding rule in the ACL, and therefore the intersection node does not have an initial priority. A current priority of the intersection node is a current priority of a node that is highest in at least one parent node of the intersection node. Both the node 2 and the node 4 are parent nodes of the intersection node, and the current priority of the node 4 is higher than a current priority of the node 2. Therefore, the current priority of the intersection node is the current priority of the node 4. In this embodiment of this application, a node in the Hasse diagram data structure not only stores initial information of a rule corresponding to the node, but also stores a current priority corresponding to the node at a current moment.

The current priority of the node is changed, and therefore a target value corresponding to an initial priority is also changed. A target value corresponding to an initial priority of 2 is used as an example. In the current Hasse diagram, there is no node whose current priority is 2, and therefore a target value is 0. A target value corresponding to an initial priority of 1 is used as an example. There are three nodes whose current priority is 1: the node 3, the node 4, and the intersection node. The target value is a sum of packet space sizes corresponding to the three nodes.

In this embodiment of this application, the intersection node is generated between the rule 2 and the rule 4, and a correlation anomaly occurs between the rule 2 and the rule 4. A current priority corresponding to the rule 3 is different from an initial priority corresponding to the rule 3, a forwarding action corresponding to the rule 3 is the same as a forwarding action corresponding to the rule 4, and a target value corresponding to the initial priority corresponding to the rule 3 is 0. Therefore, a first-type redundancy anomaly occurs between the rule 3 and the rule 4. After an anomaly is detected, a processor may send an alarm to remind a user.

For ease of understanding, the following describes a specific procedure in the embodiments of this application. In the embodiments of this application, a specific type of an anomaly that occurs between a first rule and a rule corresponding to a parent node of a first node in a Hasse diagram data structure may be detected, or a specific type of an anomaly that occurs between a first rule and a rule corresponding to a descendant node of a first node in a Hasse diagram data structure may be detected. The following separately provides detailed descriptions.

1. An anomaly occurs between a first rule and a rule corresponding to a parent node.

In a Hasse diagram data structure, one node may have only one parent node or a plurality of parent nodes. Types of anomalies may vary in different cases. The following separately provides detailed descriptions.

(1) A second node is a unique parent node of a first node.

Figure 4:
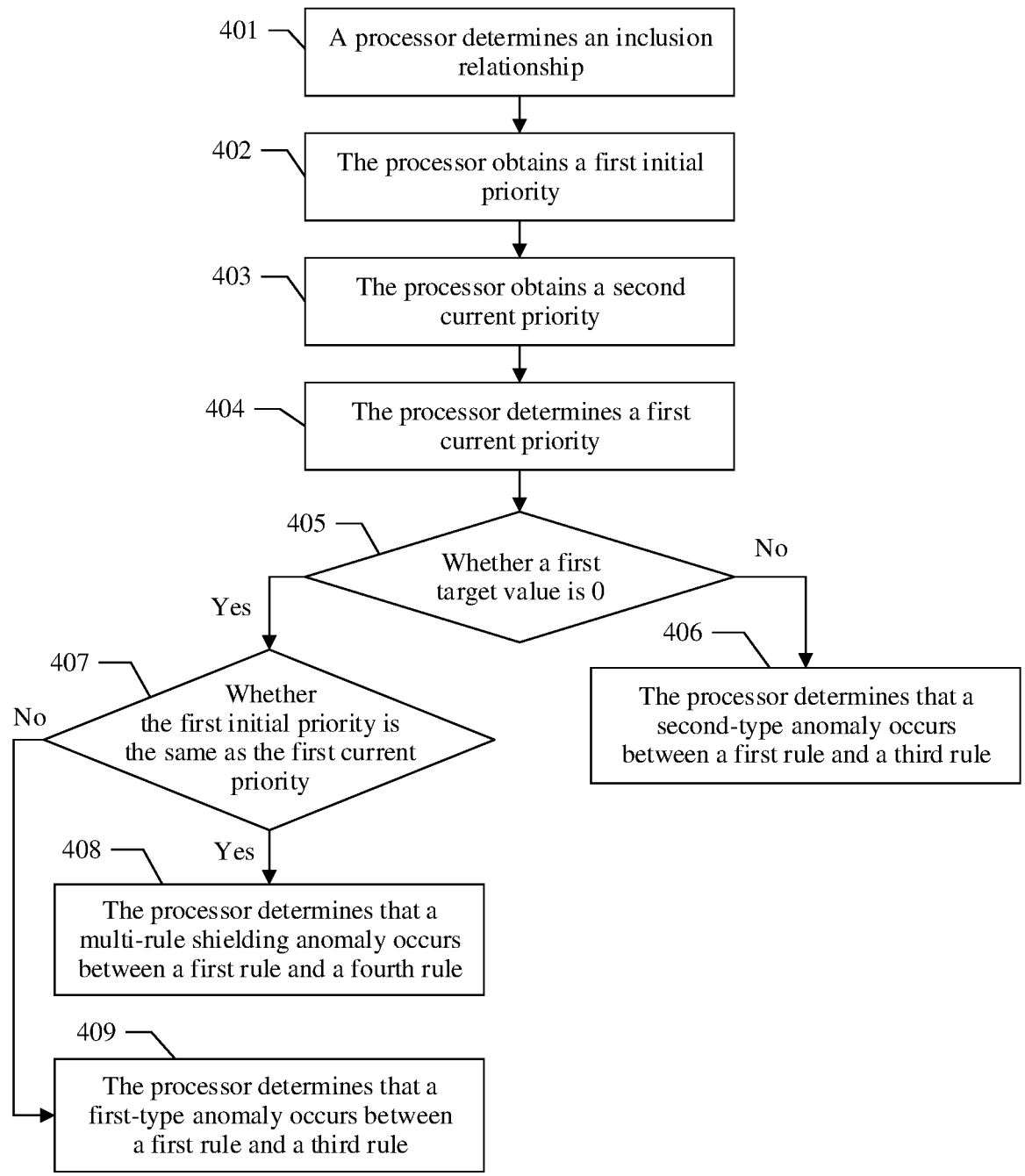
FIG. 4 is a schematic diagram of an embodiment of a rule detection method in embodiments of this application.

As shown in FIG. 4, an embodiment of rule detection in the embodiments of this application includes the following steps.

401: A processor determines an inclusion relationship.

An inclusion relationship between a first rule and a second rule is determined based on an inclusion relationship between a first initial packet space range corresponding to the first rule and a second initial packet space range corresponding to the second rule.

An initial packet space range includes a value range of a plurality of features, and may include a source address and a destination address, or may include a source address, a destination address, a source port number, and a destination port number. This is not specifically limited herein. Inclusion of a packet space range means inclusion of a plurality of features. For example, a rule 1 corresponding to a source address 0.0.0.0/0 and a destination address 0.0.0.0/1 includes a rule 2 corresponding to a source address 100.0.0.1/32 and a destination address 0.0.0.0/2. If for a rule 3, a source address is the same as the source address corresponding to the rule 2, and a destination address is 0.0.0.0/0, because the destination address corresponding to the rule 3 is not included in the destination address corresponding to the rule 1, there is no inclusion relationship between the rule 3 and the rule 1.

If the second rule includes the first rule, it is determined that the second node corresponding to the second rule is a parent node of the first node corresponding to the first rule in a Hasse diagram data structure. In this embodiment of this application, that the rule 2 includes the rule 1 is used as an example for description.

402: The processor obtains a first initial priority.

Each rule in an ACL has a corresponding initial priority, and the initial priority indicates a corresponding priority during configuration of the rule. The processor may obtain the first initial priority in a plurality of manners. The processor may obtain the first initial priority from the ACL list, or may obtain the first initial priority from the first node corresponding to the first rule. This is not specifically limited herein.

403: The processor obtains a second current priority.

The second current priority indicates a priority corresponding to the second rule at a current moment, and the second current priority may be the same as or different from a second initial priority.

It should be noted that there is no necessary sequence between steps 402 and 403. During actual application, step 402 may be performed first, or step 403 may be performed first. This is not specifically limited herein.

404: The processor determines a first current priority.

The first current priority indicates a priority corresponding to the first rule at the current moment, and the first current priority may be the same as or different from the first initial priority. The first current priority needs to be determined based on the inclusion relationship between the first rule and the second rule, the first initial priority, and the second current priority.

If the first initial priority is higher than the second current priority, the first current priority is the first initial priority, and no priority transfer occurs. If the first initial priority is lower than the second current priority, the first current priority is updated from the first initial priority to the second current priority, and priority transfer occurs.

405: The processor determines whether a first target value is 0, and performs step 407 if the first target value is 0, or performs step 406 if the first target value is not 0.

The first target value is determined based on a first target rule. A current priority corresponding to the first target rule is the first initial priority, and the first target value is equal to a sum of packet space sizes corresponding to the first target rule. A packet space size corresponding to a rule is determined based on an initial packet space size corresponding to the rule and a packet space size corresponding to a descendant node of a node corresponding to the rule in the Hasse diagram. The packet space size includes at least one element quantity. Each element quantity corresponds to one element type. The element type may be a source address, a destination address, or may be a source address, a destination address, a source port number, and a destination port number. This is not specifically limited herein.

406: The processor determines that a second-type anomaly occurs between the first rule and a third rule.

If the first target value is not 0, it may be determined that the first initial priority is higher than the second current priority, and that the second-type anomaly occurs between the first rule and the third rule, where the second-type anomaly is a second-type redundancy anomaly or a generalization anomaly.

It should be noted that the third rule may be the second rule, or may be a rule corresponding to an ancestor node of the second node. However, it needs to be determined that a third initial priority corresponding to the third rule is the same as the second current priority.

A specific type of the second-type anomaly may be determined based on a forwarding action corresponding to the first rule and a forwarding action corresponding to the third rule. If the forwarding action corresponding to the first rule is the same as the forwarding action corresponding to the third rule, it may be determined that the second-type redundancy anomaly occurs between the first rule and the third rule. If the forwarding action corresponding to the first rule is different from the forwarding action corresponding to the third rule, it may be determined that the generalization anomaly occurs between the first rule and the third rule.

407: The processor determines whether the first initial priority is the same as the first current priority, and performs step 408 if the first initial priority is the same as the first current priority, or performs step 409 if the first initial priority is different from the first current priority.

If the first target value is 0, it may be determined that an anomaly occurs between the first rule and a specific rule. However, the specific rule on which the anomaly occurs and a specific type of the anomaly further need to be determined based on a relationship between the first initial priority and the first current priority.

408: The processor determines that a multi-rule shielding anomaly occurs between the first rule and a fourth rule.

If the first target value is 0, and the first initial priority is the same as the first current priority, it may be determined that the multi-rule shielding anomaly occurs between the first rule and the fourth rule. A node corresponding to the fourth rule is a descendant node of the first node, and a current priority corresponding to the fourth rule is higher than the first current priority.

409: The processor determines that a first-type anomaly occurs between the first rule and a third rule.

If the first target value is 0, and the first initial priority is different from the first current priority, it may be determined that the first-type anomaly occurs between the first rule and the third rule. The first-type anomaly is a first-type redundancy anomaly or a shielding anomaly.

It should be noted that the third rule may be the second rule, or may be a rule corresponding to an ancestor node of the second node. However, a third initial priority corresponding to the third rule needs to be the same as the second current priority.

Whether the first-type anomaly is the first-type redundancy anomaly or the shielding anomaly may be determined based on a forwarding action corresponding to the first rule and a forwarding action corresponding to the third rule. If the forwarding action corresponding to the first rule is the same as the forwarding action corresponding to the third rule, it may be determined that the first-type redundancy anomaly occurs between the first rule and the third rule. If the forwarding action corresponding to the first rule is different from the forwarding action corresponding to the third rule, it may be determined that the shielding anomaly occurs between the first rule and the third rule.

In this embodiment of this application, a priority corresponding to a rule is introduced for rule anomaly detection. This increases rule anomaly detection coverage.

Further, after whether the first target value is 0 is determined, whether the first initial priority is the same as the first current priority is determined, and whether the forwarding actions corresponding to the rules are the same is compared, a specific rule on which an anomaly occurs can be determined, where the anomaly occurs between the specific rule and the first rule, and a specific type of the anomaly can be determined. This improves rule anomaly identification accuracy.

(2) A second node is a node with a highest current priority in a plurality of parent nodes of a first node.

Figure 5:
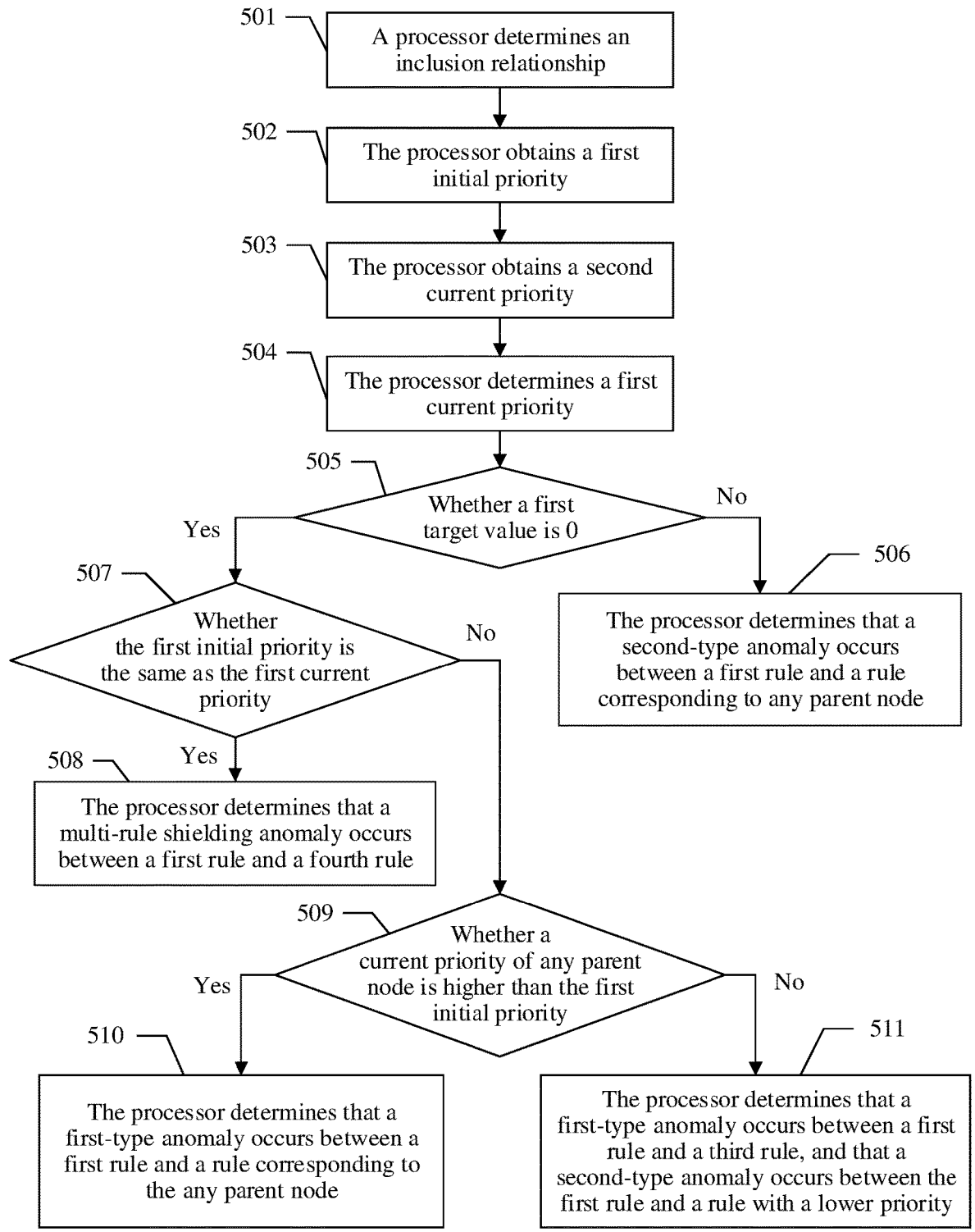
FIG. 5 is a schematic diagram of another embodiment of a rule detection method in embodiments of this application.

As shown in FIG. 5, an embodiment of rule detection in the embodiments of this application includes the following steps.

501: A processor determines an inclusion relationship.

502: The processor obtains a first initial priority.

503: The processor obtains a second current priority.

504: The processor determines a first current priority.

505: The processor determines whether a first target value is 0, and performs step 507 if the first target value is 0, or performs step 506 if the first target value is not 0.

In this embodiment, step 501 to step 505 are similar to step 401 to step 405 in the foregoing embodiment in FIG. 4. Details are not described herein again.

506: The processor determines that a second-type anomaly occurs between the first rule and a rule corresponding to any parent node.

If the first target value is not 0, it indicates that the first current priority is the same as the first initial priority, and that a priority corresponding to the first rule is not changed, in other words, an initial priority of the first node is higher than the second current priority. Because the second current priority is the highest in current priorities corresponding to a plurality of parent nodes of the first node, it may indicate that the initial priority of the first node is higher than a current priority of any parent node, and it may be determined that the second-type anomaly occurs between the first rule and the rule corresponding to the any parent node.

The second-type anomaly is a second-type redundancy anomaly or a generalization anomaly. A specific type of the second-type anomaly further needs to be determined based on forwarding actions corresponding to the rules. If a forwarding action corresponding to the first rule is the same as a forwarding action corresponding to the rule corresponding to the any parent node, it may be determined that the second-type redundancy anomaly occurs between the first rule and the rule corresponding to the parent node. If a forwarding action corresponding to the first rule is different from a forwarding action corresponding to the rule corresponding to the any parent node, it may be determined that the generalization anomaly occurs between the first rule and the rule corresponding to the parent node.

507: The processor determines whether the first initial priority is the same as the first current priority, and performs step 508 if the first initial priority is the same as the first current priority, or performs step 509 if the first initial priority is different from the first current priority.

508: The processor determines that a multi-rule shielding anomaly occurs between the first rule and a fourth rule.

In this embodiment, step 507 and step 508 are similar to step 407 and step 408 in the foregoing embodiment in FIG. 4. Details are not described herein again.

509: The processor determines whether a current priority of any parent node is higher than the first initial priority, and performs step 510 if the current priority of the any parent node is higher than the first initial priority, or performs step 511 if the current priority of the any parent node is not higher than the first initial priority.

If the first target value is 0 and the first initial priority is different from the first current priority, it may indicate that the first rule is included in a rule corresponding to a parent node of the first node. It is likely that the rule corresponding to the any parent node includes the first rule. Alternatively, it is likely that rules corresponding to some parent nodes each include the first rule. Different anomalies correspond to different cases, and a specific anomaly further needs to be determined based on a relationship between the current priority of the parent node and the first initial priority.

510: The processor determines that a first-type anomaly occurs between the first rule and a rule corresponding to any parent node.

If a current priority of the any parent node is higher than the first initial priority, it indicates that the rule corresponding to the any parent node includes the first rule, and it may be determined that the first-type anomaly occurs between the first rule and the rule corresponding to the any parent node.

The first-type anomaly is a first-type redundancy anomaly or a shielding anomaly. A specific type of the first-type anomaly further needs to be determined based on forwarding actions corresponding to the rules. If a forwarding action corresponding to the first rule is the same as a forwarding action corresponding to the rule corresponding to the any parent node, it may be determined that the first-type redundancy anomaly occurs between the first rule and the rule corresponding to the parent node. If a forwarding action corresponding to the first rule is different from a forwarding action corresponding to the rule corresponding to the any parent node, it may be determined that the shielding anomaly occurs between the first rule and the rule corresponding to the parent node.

511: The processor determines that a first-type anomaly occurs between the first rule and a third rule and a second-type anomaly occurs between the first rule and a rule with a lower priority.

When the first target value is 0, and the first initial priority is different from the first current priority, if there is a parent node whose current priority is lower than the first initial priority, it indicates that different types of anomalies occur between the first rule and rules corresponding to different parent nodes.

Because the first initial priority is different from the first current priority, it may be determined that priority transfer occurs, and that the first-type anomaly occurs between the first rule and the third rule. The third rule is a rule with a current priority that is a second current priority, and the first-type anomaly is a first-type redundancy anomaly or a shielding anomaly. A specific type of the first-type anomaly needs to be further determined based on forwarding actions corresponding to the rules. If a forwarding action corresponding to the first rule is the same as a forwarding action corresponding to the third rule, it may be determined that the first-type redundancy anomaly occurs between the first rule and the third rule. If a forwarding action corresponding to the first rule is different from a forwarding action corresponding to the third rule, it may be determined that the shielding anomaly occurs between the first rule and the third rule.

It may be further determined that the second-type anomaly occurs between the first rule and the rule with the lower priority. The rule with the lower priority is a rule corresponding to a parent node whose current priority is lower than the first initial priority in the parent nodes of the first node, and the second-type anomaly is a second-type redundancy anomaly or a generalization anomaly. A specific type of the second-type anomaly may be determined based on forwarding actions corresponding to the rules. If a forwarding action corresponding to the first rule is the same as a forwarding action corresponding to the rule with the lower priority, it may be determined that the second-type redundancy anomaly occurs between the first rule and the rule with the lower priority. If a forwarding action corresponding to the first rule is different from a forwarding action corresponding to the rule with the lower priority, it may be determined that the generalization anomaly occurs between the first rule and the rule with the lower priority.

In this embodiment of this application, a priority corresponding to a rule is introduced for rule anomaly detection. This increases rule anomaly detection coverage.

Further, when the first rule corresponds to the plurality of parent nodes, after whether the first target value is 0 is determined, a relationship between a current priority of a parent node and the first initial priority is determined through comparison, and whether the forwarding actions corresponding to the rules are the same is compared, whether an anomaly occurs between the first rule and another rule can be determined, and a specific type of the anomaly can be determined. This improves rule anomaly identification accuracy.

2. An anomaly occurs between a first rule and a rule corresponding to a descendant node.

Figure 6:
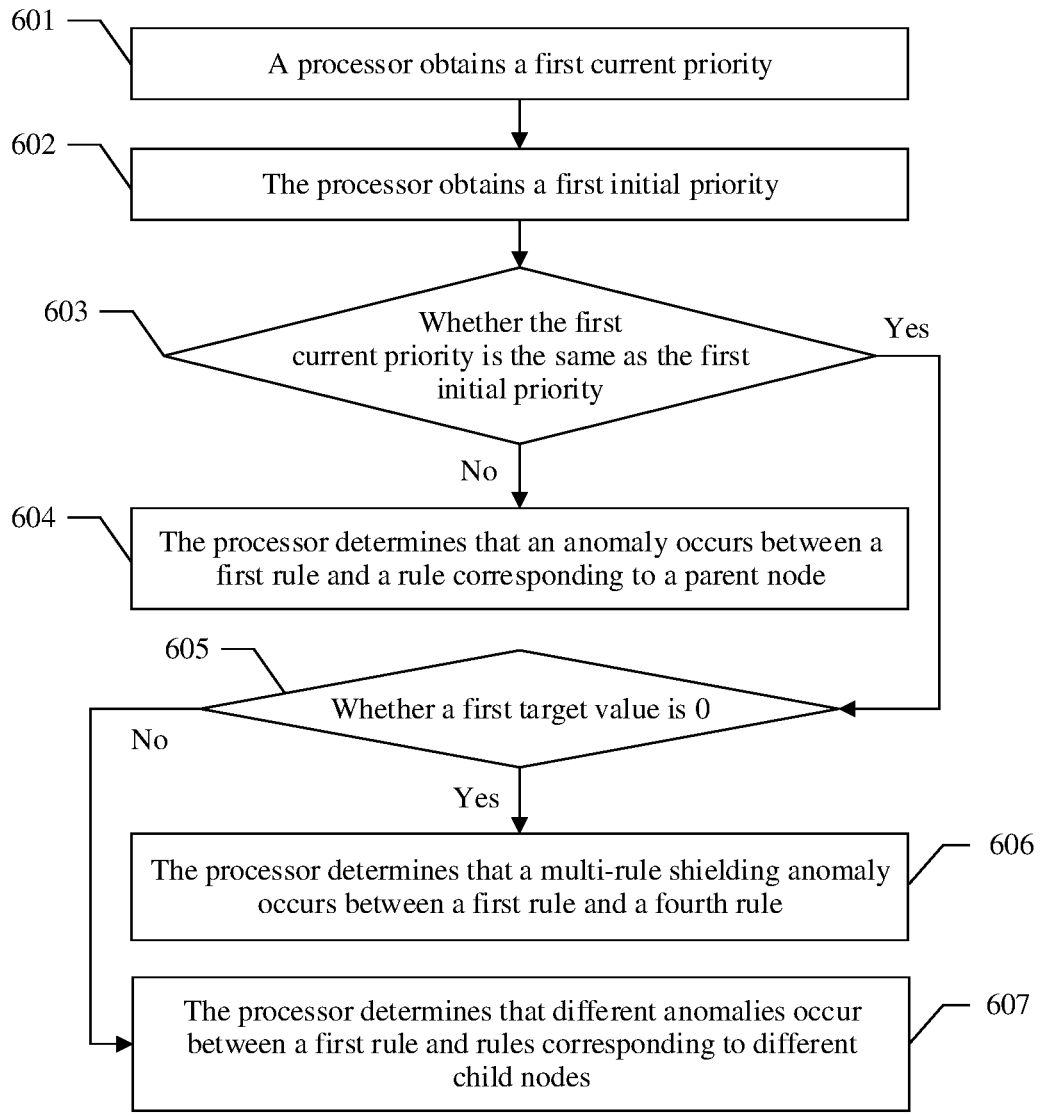
FIG. 6 is a schematic diagram of another embodiment of a rule detection method in embodiments of this application.

As shown in FIG. 6, an embodiment of rule detection in the embodiments of this application includes the following steps.

601: A processor obtains a first current priority.

The first current priority corresponding to a first rule may be the same as or different from a first initial priority. The first current priority needs to be determined based on a current priority of a parent node of a first node in a Hasse diagram data structure. A specific determining process is similar to a determining process in step 404 in the embodiment shown in FIG. 4. Details are not described herein again.

602: The processor obtains a first initial priority.

Each rule in an ACL has a corresponding initial priority, and the initial priority indicates a corresponding priority during configuration of the rule. The processor may obtain the first initial priority in a plurality of manners. The processor may obtain the first initial priority from the ACL list, or may obtain the first initial priority from the first node corresponding to the first rule. This is not specifically limited herein.

It should be noted that there is no necessary sequence between step 601 and step 602. Step 601 may be performed first, or step 602 may be performed first. This is not specifically limited herein.

603: The processor determines whether the first current priority is the same as the first initial priority, and performs step 605 if the first current priority is the same as the first initial priority, or performs step 604 if the first current priority is different from the first initial priority.

A current priority of the first node is related to the current priority of the parent node of the first node in the Hasse diagram data structure. The first current priority may be the same as or different from the first initial priority.

604: The processor determines that an anomaly occurs between the first rule and a rule corresponding to the parent node.

If the first current priority is different from the first initial priority, it indicates that priority transfer occurs. A current priority of a parent node of the first node in the Hasse diagram data structure is transferred to the first node, so that the first current priority is different from the first initial priority. In this case, an anomaly occurs between the first rule and a rule corresponding to the parent node of the first node. A specific anomaly determining process is similar to a determining process in step 409 in the embodiment shown in FIG. 4 or in step 509 in the embodiment shown in FIG. 5. Details are not described herein again.

605: The processor determines whether a first target value is 0, and performs step 606 if the first target value is 0, or performs step 607 if the first target value is not 0.

If the first current priority is the same as the first initial priority, it indicates that an initial priority of the first node is not changed, in other words, priority transfer does not occur on the first node. In this case, the first target value may be 0 or may not be 0, depending on an initial packet space range corresponding to the first node and a relationship between the initial packet space range corresponding to the first node and an initial packet space range corresponding to a descendant node of the first node.

606: The processor determines that a multi-rule shielding anomaly occurs between the first rule and a fourth rule.

If the first current priority is the same as the first initial priority, and the first target value is 0, it indicates that the initial packet space range corresponding to the descendant node of the first node completely covers the initial packet space range corresponding to the first node, and that the multi-rule shielding anomaly occurs between the first rule and the fourth rule. It should be noted that the fourth rule is determined based on a fourth node. The fourth node is a descendant node of the first node in the Hasse diagram data structure, and a current priority corresponding to the fourth node is higher than the first current priority.

For ease of understanding, further descriptions are provided with reference to Table 5.

For brevity, in Table 5, a source port number is used to indicate a packet space range. During actual application, a packet space range further includes a source address, a destination address, or a destination port number. This is not specifically limited herein.

TABLE 5

| Serial number | Priority | Source port number |
| --- | --- | --- |
| 1 | 1 | 301:500 |
| 2 | 2 | 201:300 |
| 3 | 3 | 0:200 |
| 4 | 4 | 0:500 |
| 5 | 5 | 201:500 |

It can be learned from Table 5 that, in the Hasse diagram data structure, a node 4 is a parent node of a node 3 and a node 5, and the node 5 is a parent node of a node 1 and a node 2.

Target values corresponding to a priority of 1, a priority of 2, and a priority of 3 are equal to initial packet space sizes corresponding to a rule 1, a rule 2, and a rule 3, and are 200, 100, and 201, respectively. Because a priority corresponding to a rule 5 is lower than a priority corresponding to a rule 4, and the rule 4 includes the rule 5, a current priority corresponding to the rule 5 is 4. Actually, there is no rule having a priority of 5, and therefore a target value corresponding to the priority of 5 is 0. In addition, an initial packet space range corresponding to the rule 5 is completely covered by the initial packet space sizes corresponding to the rule 1 and the rule 2, and the node 5 is the parent node of the node 1 and the node 2. Therefore, a packet space size corresponding to the node 5 is 0. A target value corresponding to the rule 4 is a sum of packet space sizes corresponding to all rules with a current priority of 4, that is, a sum of packet space sizes corresponding to the rule 4 and the rule 5. A packet space size corresponding to the rule 4 is a value obtained by subtracting a packet space size corresponding to a descendant node of the node 4 from an initial packet space size corresponding to the rule 4, that is, 501-201-0-200-100=0. Therefore, the target value corresponding to rule 4 is 0+0=0.

In this case, a multi-rule shielding anomaly does not occur between the rule 4 and rules corresponding to all descendant nodes of the node 4. For example, a first-type anomaly occurs between the rule 4 and the rule 5. Therefore, specific rules on which a multi-rule shielding anomaly occurs need to be clarified, where the multi-rule shielding anomaly occurs between the specific rules and the first rule. A restriction is that current priorities corresponding to these rules are higher than the first current priority.

607: The processor determines that different anomalies occur between the first rule and rules corresponding to different descendant nodes.

If the first target value is not 0, it indicates that the initial packet space range corresponding to the first rule is not completely covered by the initial packet space range corresponding to the descendant node of the first node. In this case, an anomaly is not a multi-rule shielding anomaly, and a specific type of the anomaly needs to be determined based on a current priority of the descendant node.

If the current priority of the descendant node is the same as the first current priority, the processor may determine that a first-type anomaly occurs between the first rule and a rule corresponding to the descendant node. A specific type of the first-type anomaly may be determined based on forwarding actions corresponding to the two rules, and a specific step of determining the specific type of the first-type anomaly is similar to step 409 in the embodiment shown in FIG. 4. Details are not described herein again. A difference is that in step 409, the first-type anomaly occurs between the first rule and the third rule, whereas in this embodiment, the first-type anomaly occurs between the first rule and the rule corresponding to the descendant node of the first node.

If the current priority of the descendant node is higher than the first current priority, the processor may determine that a second-type anomaly occurs between the first rule and a rule corresponding to the descendant node. A specific type of the second-type anomaly may be determined based on forwarding actions corresponding to the two rules, and a specific determining step is similar to step 406 in the embodiment shown in FIG. 4. Details are not described herein again. A difference is that in step 406, the second-type anomaly occurs between the first rule and the third rule, whereas in this embodiment, the second-type anomaly occurs between the first rule and the rule corresponding to the descendant node of the first node.

In this embodiment of this application, a priority corresponding to a rule is introduced for rule anomaly detection. This increases rule anomaly detection coverage.

Further, during detection of an anomaly between the first rule and the rule corresponding to the descendant node, after whether the first target value is 0 is determined, and a relationship between the first current priority and the current priority corresponding to the child node is determined through comparison, a specific type of the anomaly that occurs between the first rule and the rule corresponding to the child node can be determined. Different processing methods are used in different cases. This increases flexibility of the solution, and improves identification accuracy.

When the rule detection method used in the embodiments of this application is specifically applied, the processor creates a priority list, and the priority list is updated as a node corresponding to a rule is added to the Hasse diagram.

Figure 7:
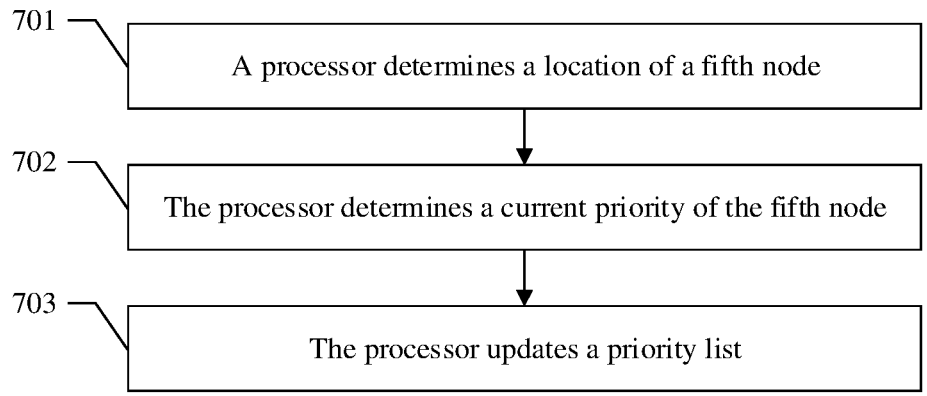
FIG. 7 is a schematic diagram of another embodiment of a rule detection method in embodiments of this application.

As shown in FIG. 7, an embodiment of rule detection in the embodiments of this application includes the following steps.

701: A processor determines a location of a fifth node.

The fifth node corresponds to a fifth rule, and the location of the fifth node in a Hasse diagram is determined based on an initial packet space range corresponding to the fifth rule. In an existing Hasse diagram, traversing is started from a root node to a child node, and the location of the fifth node is determined through comparison between the initial packet space range corresponding to the fifth node and an initial packet space range corresponding to an existing node.

702: The processor determines a current priority of the fifth node.

A parent node of the fifth node is determined based on the location of the fifth node. If the fifth node has no parent node, it may be determined that a fifth current priority is a fifth initial priority. If the fifth node has a parent node, a fifth current priority needs to be determined based on a relationship between a fifth initial priority corresponding to the fifth rule and a current priority of the parent node of the fifth node. A specific determining manner is similar to a determining manner in step 404 in the embodiment shown in FIG. 4. Details are not described herein again.

703: The processor updates a priority list.

When the fifth node is added to the Hasse diagram, a new index is created in the priority list, and is used to store the fifth initial priority and a target value corresponding to the fifth initial priority, and indicate a specific node that actually uses the fifth initial priority.

A different current priority corresponding to the fifth node leads to a different updated priority list. Addition of the fifth node may change a current priority of a descendant node of the fifth node, and further change a priority corresponding to the descendant node before the fifth node is added. Alternatively, addition of the fifth node may not change a current priority of a descendant node of the fifth node. This is not specifically limited herein. Addition of the fifth node may further change the current priority of the fifth node. The current priority of the fifth node may be the same as or different from an initial priority of the fifth node, depending on the relationship between the fifth initial priority and the current priority of the parent node of the fifth node. This is not specifically limited herein. However, it should be noted that a target value corresponding to an initial priority of n (n is a positive integer greater than or equal to 1) is usually a sum of packet space sizes corresponding to all rules with a current priority of n.

In this embodiment of this application, a priority corresponding to a rule is introduced for rule anomaly detection. This increases rule anomaly detection coverage.

Further, the target value is stored in the priority list, and the priority list is updated in a process of adding a node. This improves flexibility and feasibility of the solution.

Figure 8:
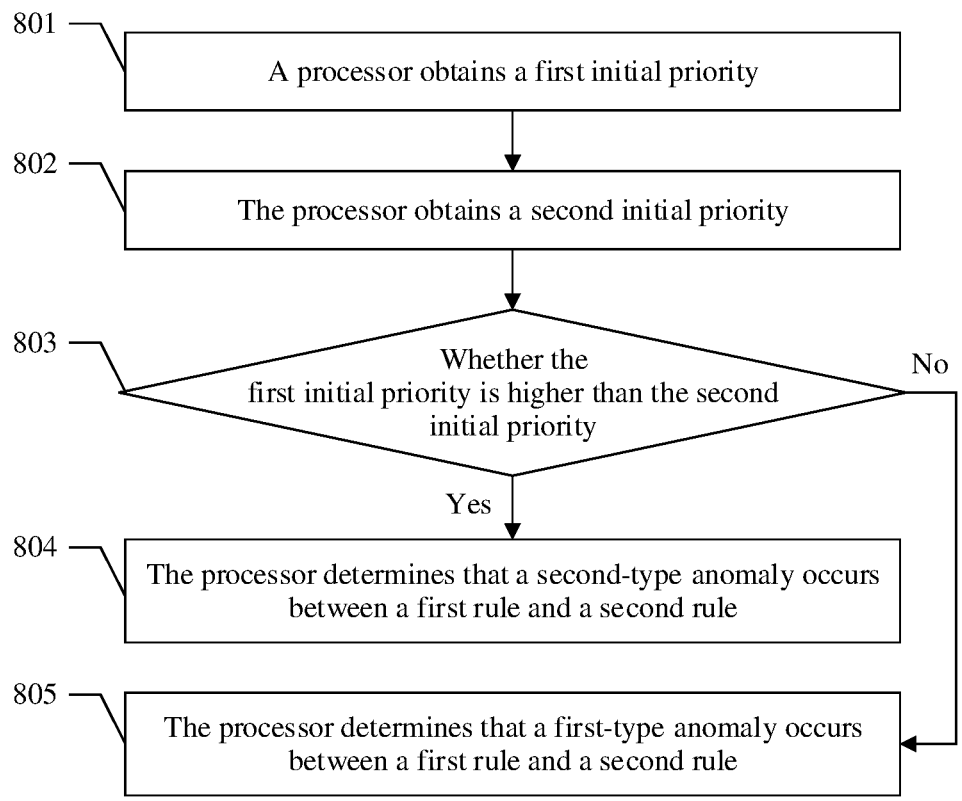
FIG. 8 is a schematic diagram of another embodiment of a rule detection method in embodiments of this application.

When the rule detection method used in this embodiment of this application is specifically applied, an anomaly may be further detected through comparison between initial priorities between a parent node and a child node. Specifically, as shown in FIG. 8, an embodiment of rule detection in the embodiments of this application includes the following steps.

801: A processor obtains a first initial priority.

Each rule in an ACL has a corresponding initial priority, and the initial priority indicates a corresponding priority during configuration of the rule. The processor may obtain the first initial priority in a plurality of manners. The processor may obtain the first initial priority from the ACL list, or may obtain the first initial priority from a first node corresponding to a first rule. This is not specifically limited herein.

802: The processor obtains a second initial priority.

The processor may obtain the second initial priority in a plurality of manners. The processor may obtain the second initial priority from the ACL list, or may obtain the second initial priority from a second node corresponding to a second rule. This is not specifically limited herein. It should be noted that the second node is a parent node of the first node in a Hasse diagram data structure.

803: The processor determines whether the first initial priority is higher than the second initial priority, and performs step 804 if the first initial priority is higher than the second initial priority, or performs step 805 if the first initial priority is not higher than the second initial priority.

After obtaining the first initial priority and the second initial priority, the processor needs to determine a relationship between the first initial priority and the second initial priority.

804: The processor determines that a second-type anomaly occurs between the first rule and the second rule.

If the first initial priority is higher than the second initial priority, it is determined that the second-type anomaly occurs between the first rule and the second rule. A specific type of the second-type anomaly may be further determined based on forwarding actions corresponding to the first node and the second node. A specific determining step is similar to step 406 in the embodiment shown in FIG. 4. Details are not described herein again.

805: The processor determines that a first-type anomaly occurs between the first rule and the second rule.

If the first initial priority is lower than the second initial priority, it is determined that the first-type anomaly occurs between the first rule and the second rule. A specific type of the first-type anomaly may be further determined based on forwarding actions corresponding to the first node and the second node. A specific determining step is similar to step 409 in the embodiment shown in FIG. 4. Details are not described herein again.

In this embodiment of this application, a priority corresponding to a rule is introduced for rule anomaly detection. This increases rule anomaly detection coverage.

Further, after a relationship between the initial priority of the child node and the initial priority of the parent node is determined through comparison, whether a second-type anomaly occurs between a rule corresponding to the child node and a rule corresponding to the parent node may be determined. A manner of determining whether an anomaly occurs is simple, and fewer steps are required.

The following describes a rule detection apparatus in the embodiments of this application.

Figure 9:
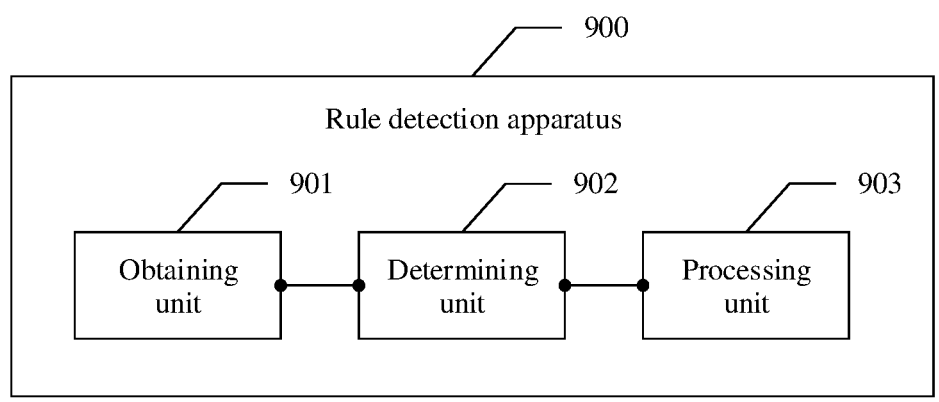
FIG. 9 is a schematic structural diagram of a rule detection apparatus in embodiments of this application.

FIG. 9 is a schematic diagram of a rule detection apparatus 900 in the embodiments of this application. An embodiment of the rule detection apparatus 900 in this application includes an obtaining unit 901, configured to obtain a first initial priority corresponding to a first rule, and obtain a second current priority corresponding to a second rule, and a determining unit 902, configured to determine, based on the first initial priority, the second current priority, and an inclusion relationship between the first rule and the second rule, a first current priority corresponding to the first rule, and determine, based on the first initial priority and the first current priority, whether an anomaly occurs on the first rule.

In some optional embodiments of this application, the determining unit 902 is further configured to determine the inclusion relationship between the first rule and the second rule based on a first initial packet space range corresponding to the first rule and a second initial packet space range corresponding to the second rule, where the first initial packet space range includes a value range of each first feature, and the second initial packet space range includes a value range of each second feature, and if the second initial packet space range includes the first initial packet space range, determine that the second rule includes the first rule, where a second node is an ancestor node of a first node in a Hasse diagram data structure, the first rule corresponds to the first node in the Hasse diagram data structure, and the second rule corresponds to the second node in the Hasse diagram data structure.

In some optional embodiments of this application, the determining unit 902 is further configured to, if the second node is a parent node of the first node in the Hasse diagram data structure, and the second node is a node with a highest priority in at least one parent node, determine whether the first initial priority is higher than the second current priority, and if the first initial priority is higher than the second current priority, determine that the first current priority is the first initial priority, or if the first initial priority is lower than the second current priority, determine that the first current priority is the second current priority.

In some optional embodiments of this application, the rule detection apparatus 900 further includes a processing unit 903.

The determining unit 902 is further configured to determine a first target node based on the Hasse diagram data structure, where a current priority corresponding to the first target node is the same as the first initial priority, and determine an initial packet space size corresponding to the first target node, where the initial packet space size is determined based on at least one element quantity corresponding to the first target node, and each element quantity corresponds to one element type.

The obtaining unit 901 is further configured to obtain, based on the Hasse diagram data structure, a packet space size corresponding to a child node of the first target node, where the packet space size corresponding to the child node is determined based on a quantity of non-overlapping elements between the child node and a descendant node of the child node.

The determining unit 902 is further configured to determine, based on the initial packet space size and the packet space size corresponding to the child node, a packet space size corresponding to the first target node, where the packet space size corresponding to the first target node is determined based on a quantity of non-overlapping elements between the first target node and a descendant node of the first target node.

The processing unit 903 is configured to calculate a sum of packet space sizes corresponding to the first target node, to obtain a first target value corresponding to the first initial priority.

The determining unit 902 is further configured to determine, based on the first initial priority, the first current priority, and the first target value, whether an anomaly occurs on the first rule, and if the first initial priority is different from the first current priority, and the first target value is 0, determine that an anomaly occurs between the first rule and a third rule, where a third node corresponding to the third rule is an ancestor node of the first node in the Hasse diagram data structure, or if the first initial priority is the same as the first current priority, and the first target value is 0, determine that an anomaly occurs between the first rule and a fourth rule, where a fourth node corresponding to the fourth rule is a descendant node of the first node in the Hasse diagram.

In some optional embodiments of this application, the determining unit 902 is further configured to determine the third rule based on the second current priority, where a third initial priority corresponding to the third rule is the same as the second current priority.

The obtaining unit 901 is further configured to obtain a first forwarding action corresponding to the first rule, and obtain a second forwarding action corresponding to the third rule.

The determining unit 902 is further configured to, if the first initial priority is different from the first current priority, the first target value is 0, and the first forwarding action is the same as the second forwarding action, determine that a first-type redundancy anomaly occurs between the first rule and the third rule, or if the first initial priority is different from the first current priority, the first target value is 0, and the first forwarding action is different from the second forwarding action, determine that a shielding anomaly occurs between the first rule and the third rule.

In some optional embodiments of this application, the determining unit 902 is further configured to determine the fourth rule based on the fourth node, where the fourth node is a descendant node of the first node in the Hasse diagram data structure, and a fourth current priority corresponding to the fourth node is higher than the first current priority, and determine that a multi-rule shielding anomaly occurs between the first rule and the fourth rule.

In some optional embodiments of this application, the obtaining unit 901 is further configured to obtain, based on a priority list, the first target value corresponding to the first initial priority, where the priority list includes K initial priorities, K target values, and K nodes, there are one-to-one correspondences between the initial priorities, the target values, and the K nodes, and K is an integer greater than or equal to 1.

In some optional embodiments of this application, the processing unit 903 is further configured to add a fifth node corresponding to a fifth rule to the Hasse diagram data structure.

The determining unit 902 is further configured to determine, based on a second target node, a second target value corresponding to a fifth initial priority, where a current priority of the second target node is the same as the fifth initial priority.

The processing unit 903 is further configured to store the fifth initial priority corresponding to the fifth node and the second target value in a to-be-updated priority list, and update the to-be-updated priority list based on the second target value, to obtain the priority list.

In this embodiment, the rule detection apparatus may perform the operations performed by the processor in the embodiment shown in FIG. 4, FIG. 5, FIG. 6, or FIG. 7. Details are not described herein again.

Figure 10:
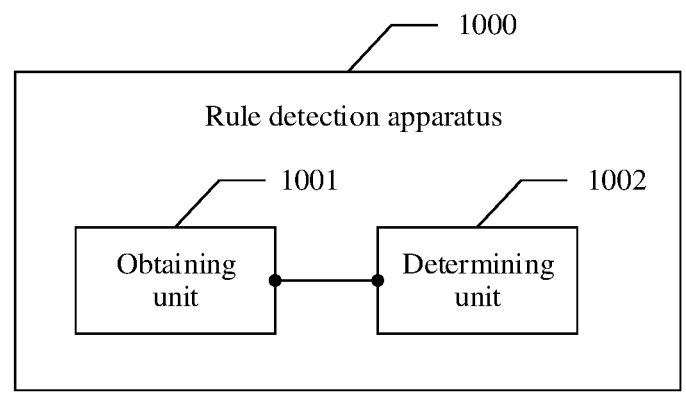
FIG. 10 is a schematic structural diagram of another rule detection apparatus in embodiments of this application.

FIG. 10 is a schematic diagram of a rule detection apparatus 1000 in the embodiments of this application. An embodiment of the rule detection apparatus 1000 in this application includes an obtaining unit 1001, configured to obtain a first initial priority corresponding to a first rule, where the first rule corresponds to a first node in a Hasse diagram data structure, and the first initial priority is stored in the first node, where the obtaining unit 1001 is further configured to obtain a second initial priority corresponding to a second node, where the second node is a parent node of the first node in the Hasse diagram data structure, and a determining unit 1002, configured to determine, based on the first initial priority and the second initial priority, whether an anomaly occurs between the first rule and the second rule.

In some optional embodiments of this application, the determining unit 1002 is further configured to, if the first initial priority is higher than the second initial priority, determine that an anomaly occurs between the first rule and the second rule.

In some optional embodiments of this application, the obtaining unit 1001 is further configured to obtain a first forwarding action corresponding to the first rule, and obtain a second forwarding action corresponding to the second rule.

The determining unit 1002 is further configured to, if the first forwarding action is the same as the second forwarding action, determine that a second-type redundancy anomaly occurs between the first rule and the second rule, or if the first forwarding action is different from the second forwarding action, determine that a generalization anomaly occurs between the first rule and the second rule.

In this embodiment, the rule detection apparatus may perform the operations performed by the processor in the embodiment shown in FIG. 8. Details are not described herein again.

Figure 11:
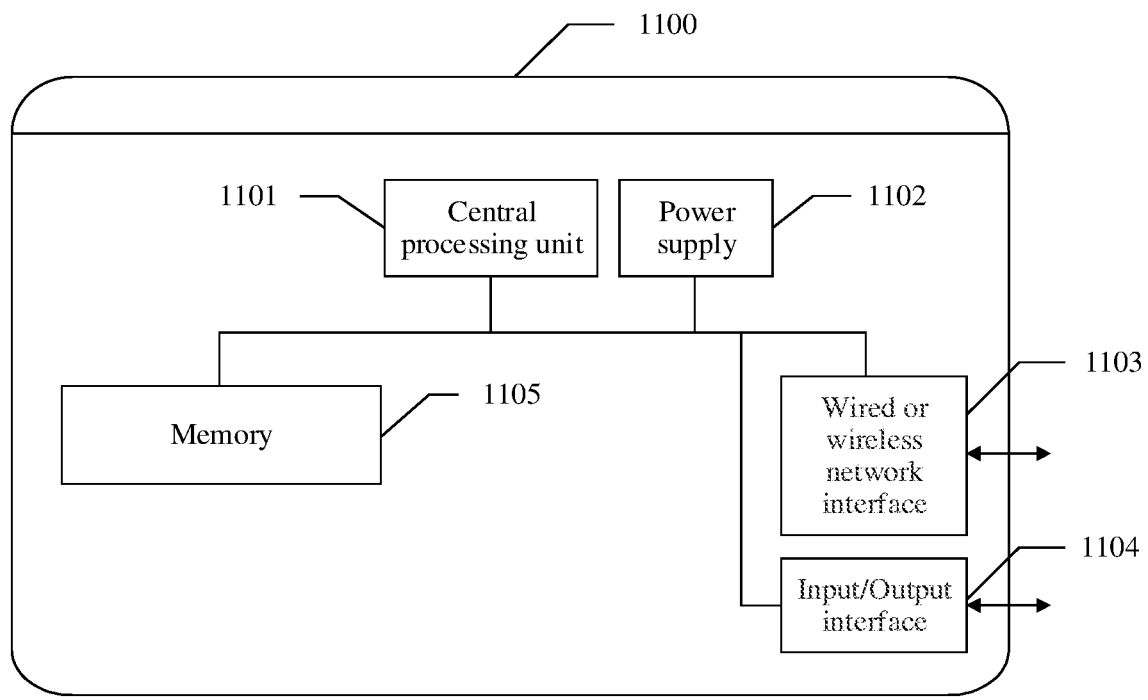
FIG. 11 is a schematic structural diagram of a computer device in embodiments of this application.

FIG. 11 is a schematic structural diagram of a computer device according to an embodiment of this application. The computer device 1100 may include one or more central processing units (CPU) 1101 and a memory 1105. The memory 1105 stores one or more application programs or data.

The memory 1105 may be a volatile memory or a persistent memory. The programs stored in the memory 1105 may include one or more modules, and each module may include a series of instruction operations for the computer device. Further, the central processing unit 1101 may be configured to communicate with the memory 1105, and perform, on the computer device 1100, the series of instruction operations in the memory 1105.

The computer device 1100 may further include one or more power supplies 1102, one or more wired or wireless network interfaces 1103, one or more input/output interfaces 1104, and/or one or more operating systems such as Windows Server™, Mac OS X™, Unix™, Linux™, and FreeBSD™.

The computer device 1100 may perform the operations performed by the processor in the embodiments shown in FIG. 2 to FIG. 7. Details are not described herein again.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

Figure 12:
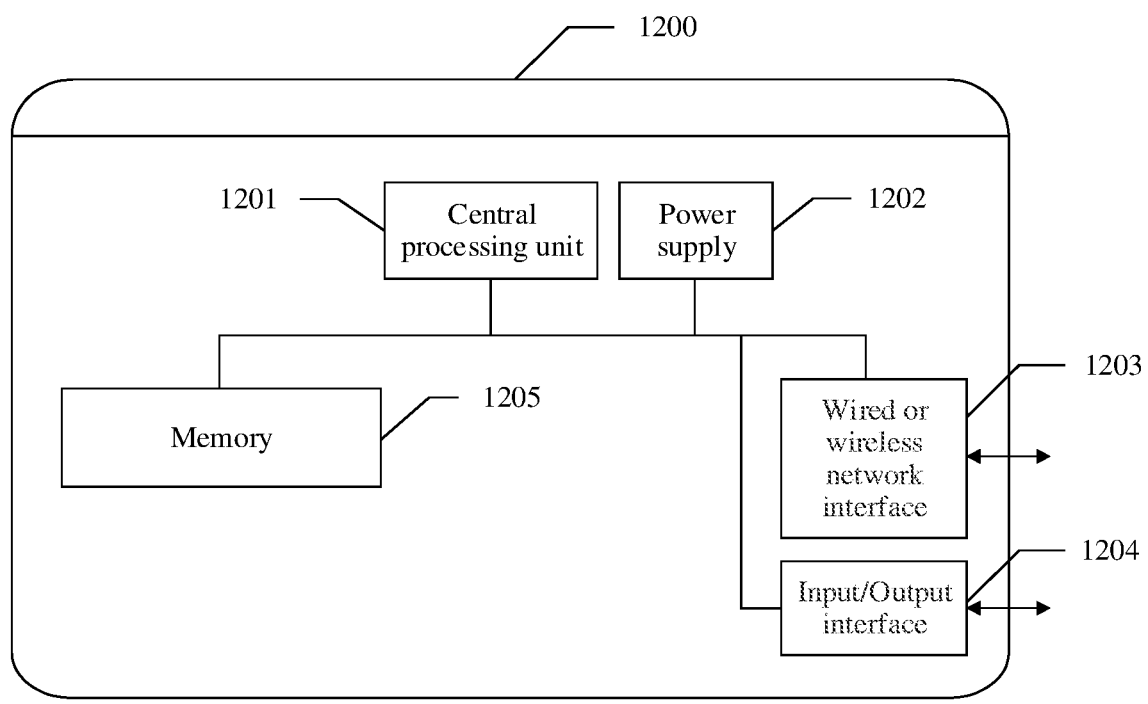
FIG. 12 is a schematic structural diagram of another computer device in embodiments of this application.

FIG. 12 is a schematic structural diagram of a computer device according to an embodiment of this application. The computer device 1200 may include one or more central processing units (CPU) 1201 and a memory 1205. The memory 1205 stores one or more application programs or data.

The memory 1205 may be a volatile memory or a persistent memory. The programs stored in the memory 1205 may include one or more modules, and each module may include a series of instruction operations for the computer device. Further, the central processing unit 1201 may be configured to communicate with the memory 1205, and perform, on the computer device 1200, the series of instruction operations in the memory 1205.

The computer device 1200 may further include one or more power supplies 1202, one or more wired or wireless network interfaces 1203, one or more input/output interfaces 1204, and/or one or more operating systems such as Windows Server™, Mac OS X™, Unix™, Linux™, and FreeBSD™.

The computer device 1200 may perform the operations performed by the processor in the embodiment shown in FIG. 8. Details are not described herein again.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk drive, a read-only memory (ROM), a random access memory (RAM), a magnetic disk, or an optical disc.

What is claimed is:

1. A rule detection method, comprising:
obtaining, by a device, a first rule for inclusion in an access control list associated with the device;
obtaining, from the first rule, a first initial priority corresponding to the first rule;
obtaining, from a second rule of the access control list, a second current priority corresponding to the second rule;
determining an inclusion relationship between the first rule and the second rule;
determining a first current priority corresponding to the first rule based on the first initial priority, the second current priority, and the inclusion relationship between the first rule and the second rule;
determining a first target node based on a Hasse diagram data structure, wherein a current priority corresponding to the first target node is the same as the first initial priority;
obtaining a first target value corresponding to the first initial priority by calculating a sum of packet space sizes corresponding to the first target node, wherein the packet space sizes corresponding to the first target node represent a quantity of non-overlapping elements between the first target node and a descendant node of the first target node;
determining, based on the first initial priority, the first current priority, and the first target value, whether a rule anomaly occurs on the first rule; and
sending an alarm to a user in response to determining that the rule anomaly has occurred, wherein the alarm provides rule anomaly information to the user.

2. The rule detection method according to claim 1, wherein determining the inclusion relationship between the first rule and the second rule comprises:
determining the inclusion relationship between the first rule and the second rule based on a first initial packet space range corresponding to the first rule and a second initial packet space range corresponding to the second rule, wherein the first initial packet space range comprises a value range of each first feature of a plurality of first features associated with the first initial packet space range, and the second initial packet space range comprises a value range of each second feature of a plurality of second features associated with the second initial packet space range; and
determining that the second rule comprises the first rule in response to the second initial packet space range comprising the first initial packet space range, wherein a second node is an ancestor node of a first node in the Hasse diagram data structure, wherein the first rule corresponds to the first node in the Hasse diagram data structure, and wherein the second rule corresponds to the second node in the Hasse diagram data structure.

3. The rule detection method according to claim 2, wherein the determining the first current priority corresponding to the first rule comprises:
determining whether the first initial priority is higher than the second current priority in response to the second node being a parent node of the first node in the Hasse diagram data structure, and further in response to the second node being a node with a highest current priority in at least one parent node; and
performing at least one of:
determining that the first current priority is the first initial priority in response to the first initial priority being higher than the second current priority; or
determining that the first current priority is the second current priority in response to the first initial priority being lower than the second current priority.

4. The rule detection method according to claim 2, further comprising performing, after determining the first target node based on the Hasse diagram data structure:
determining an initial packet space size corresponding to the first target node, wherein the initial packet space size is determined based on at least one element quantity corresponding to the first target node, and wherein each element quantity corresponds to one element type;
obtaining, based on the Hasse diagram data structure, a packet space size corresponding to a child node of the first target node, wherein the packet space size corresponding to the child node is determined based on a quantity of non-overlapping elements between the child node and a descendant node of the child node; and
determining, based on the initial packet space size and the packet space size corresponding to the child node, the packet space size corresponding to the first target node, wherein the packet space size corresponding to the first target node is determined based on a quantity of non-overlapping elements between the first target node and the descendant node of the first target node;
wherein the determining whether the rule anomaly occurs on the first rule comprises performing at least one of:
determining that the rule anomaly occurs between the first rule and a third rule in response to the first initial priority being different from the first current priority, and further in response to the first target value being zero, wherein a third node corresponding to the third rule is an ancestor node of the first node in the Hasse diagram data structure; or
determining that the rule anomaly occurs between the first rule and a fourth rule in response to the first initial priority being the same as the first current priority, and further in response to the first target value being zero, wherein a fourth node corresponding to the fourth rule is a descendant node of the first node in the Hasse diagram data structure.

5. The rule detection method according to claim 4, further comprising:
determining the third rule based on the second current priority, wherein a third current priority corresponding to the third rule is the same as the second current priority;
obtaining a first forwarding action corresponding to the first rule; and
obtaining a second forwarding action corresponding to the third rule; and wherein the determining that the rule anomaly occurs between the first rule and the third rule comprises performing at least one of:
    determining that a first-type redundancy anomaly occurs between the first rule and the third rule in response to the first initial priority being different from the first current priority, further in response to the first target value being zero, and further in response to the first forwarding action being the same as the second forwarding action; or
    determining that a shielding anomaly occurs between the first rule and the third rule in response to the first initial priority being different from the first current priority, further in response to the first target value being zero, and further in response to the first forwarding action being different from the second forwarding action.

6. The rule detection method according to claim 4, further comprising:
    determining the fourth rule based on the fourth node, wherein the fourth node is a descendant node of the first node in the Hasse diagram data structure, and wherein a fourth current priority corresponding to the fourth node is higher than the first current priority; and
    wherein the determining that the rule anomaly occurs between the first rule and the fourth rule comprises:
    determining that a multi-rule shielding anomaly occurs between the first rule and the fourth rule.

7. The rule detection method according to claim 4, wherein the obtaining the first target value corresponding to the first initial priority comprises:
    obtaining, based on a priority list, the first target value corresponding to the first initial priority, wherein the priority list comprises K initial priorities, K target values, and K nodes, wherein there are one-to-one correspondences between the K initial priorities, the K target values, and the K nodes, and wherein K is an integer greater than or equal to 1.

8. The rule detection method according to claim 7, further comprising performing, before the obtaining the first target value corresponding to the first initial priority:
    adding a fifth node corresponding to a fifth rule to the Hasse diagram data structure;
    determining, based on a second target node, a second target value corresponding to a fifth initial priority, wherein a current priority of the second target node is the same as the fifth initial priority;
    storing the fifth initial priority corresponding to the fifth node and the second target value in a to-be-updated priority list; and
    obtaining the priority list by updating the to-be-updated priority list based on the second target value.

9. A rule detection method, comprising:
    obtaining, by a device, a first rule for inclusion in an access control list associated with the device;
    obtaining a first initial priority corresponding to the first rule, wherein the first rule corresponds to a first node in a Hasse diagram data structure comprising at least one node, and wherein the first initial priority is stored in the first node;
    obtaining, from a second rule of the access control list, a second initial priority corresponding to a second node, wherein the second node is a parent node of the first node in the Hasse diagram data structure and wherein the second node corresponds to the second rule;
    determining a first target node based on the Hasse diagram data structure, wherein a current priority corresponding to the first target node is the same as the first initial priority;
    obtaining a first target value corresponding to the first initial priority by calculating a sum of packet space sizes corresponding to the first target node, wherein the packet space sizes corresponding to the first target node represent a quantity of non-overlapping elements between the first target node and a descendant node of the first target node;
    determining, based on the first initial priority, the second initial priority and the first target value, whether a rule anomaly occurs between the first rule and the second rule; and
    sending an alarm to a user in response to determining that the rule anomaly has occurred, wherein the alarm provides rule anomaly information to the user.

10. The rule detection method according to claim 9, wherein the determining whether the rule anomaly occurs between the first rule and the second rule comprises:
    determining that the rule anomaly occurs between the first rule and the second rule in response to the first initial priority being higher than the second initial priority.

11. The rule detection method according to claim 10, further comprising:
    obtaining a first forwarding action corresponding to the first rule; and
    obtaining a second forwarding action corresponding to the second rule;
    wherein the determining that the rule anomaly occurs between the first rule and the second rule comprises performing at least one of:
    determining that a second-type redundancy anomaly occurs between the first rule and the second rule in response to the first forwarding action being the same as the second forwarding action; or
    determining that a generalization anomaly occurs between the first rule and the second rule in response to the first forwarding action being different from the second forwarding action.

12. A rule detection apparatus, comprising:
    at least one processor; and
    one or more non-transitory computer readable memories coupled to the at least one processor and storing instructions that, when executed by the at least one processor, cause the apparatus to:
    obtain a first rule for inclusion in an access control list;
    obtain, from the first rule, a first initial priority corresponding to the first rule;
    obtain, from a second rule of the access control list, a second current priority corresponding to the second rule;
    determine a first current priority corresponding to the first rule based on the first initial priority, the second current priority, and an inclusion relationship between the first rule and the second rule;
    determine a first target node based on a Hasse diagram data structure, wherein a current priority corresponding to the first target node is the same as the first initial priority;
    obtain a first target value corresponding to the first initial priority by calculating a sum of packet space sizes corresponding to the first target node, wherein the packet space sizes corresponding to the first target node represent a quantity of non-overlapping elements between the first target node and a descendant node of the first target node;
determine, based on the first initial priority, the first current priority and the first target value, whether a rule anomaly occurs on the first rule; and
send an alarm to a user in response to determining that the rule anomaly has occurred, wherein the alarm provides rule anomaly information to the user.

13. The rule detection apparatus according to claim 12, wherein the instructions, when executed by the at least one processor, further cause the apparatus to:
determine the inclusion relationship between the first rule and the second rule based on a first initial packet space range corresponding to the first rule and a second initial packet space range corresponding to the second rule, wherein the first initial packet space range comprises a value range of each first feature of a plurality of first features associated with the first initial packet space range, and the second initial packet space range comprises a value range of each second feature of a plurality of second features associated with the second initial packet space range; and
determine that the second rule comprises the first rule in response to the second initial packet space range comprising the first initial packet space range, wherein a second node is an ancestor node of a first node in the Hasse diagram data structure, wherein the first rule corresponds to the first node in the Hasse diagram data structure, and wherein the second rule corresponds to the second node in the Hasse diagram data structure.

14. The rule detection apparatus according to claim 13, wherein the instructions, when executed by the at least one processor, further cause the apparatus to:
determine whether the first initial priority is higher than the second current priority in response to the second node being a parent node of the first node in the Hasse diagram data structure, and further in response to the second node being a node with a highest current priority in at least one parent node; and
perform at least one of
determine that the first current priority is the first initial priority in response to the first initial priority being higher than the second current priority; or
determine that the first current priority is the second current priority in response to the first initial priority being lower than the second current priority.

15. The rule detection apparatus according to claim 13, wherein the instructions, when executed by the at least one processor, furthercause the apparatus to, after determining the first target node based on the Hasse diagram data structure:
determine an initial packet space size corresponding to the first target node, wherein the initial packet space size is determined based on at least one element quantity corresponding to the first target node, and wherein each element quantity corresponds to one element type;
obtain, based on the Hasse diagram data structure, a packet space size corresponding to a child node of the first target node, wherein the packet space size corresponding to the child node is determined based on a quantity of non -overlapping elements between the child node and a descendant node of the child node;
determine, based on the initial packet space size and the packet space size corresponding to the child node, the packet space size corresponding to the first target node, wherein the packet space size corresponding to the first target node is determined based on a quantity of non-overlapping elements between the first target node and the descendant node of the first target node; and
perform at least one of:
determine that a rule anomaly occurs between the first rule and a third rule, in response to the first initial priority being different from the first current priority, and further in response to the first target value being zero, wherein a third node corresponding to the third rule is an ancestor node of the first node in the Hasse diagram data structure; or determine that a rule anomaly occurs between the first rule and a fourth rule in response to the first initial priority being the same as the first current priority, and further in response to the first target value being zero, wherein a fourth node corresponding to the fourth rule is a descendant node of the first node in the Hasse diagram data structure.

16. The rule detection apparatus according to claim 15, wherein the instructions, when executed by the at least one processor, further cause the apparatus to:
determine the third rule based on the second current priority, wherein a third current priority corresponding to the third rule is the same as the second current priority;
obtain a first forwarding action corresponding to the first rule;
obtain a second forwarding action corresponding to the third rule; and
perform at least one of:
determine that a first-type redundancy anomaly occurs between the first rule and the third rule in response to the first initial priority being different from the first current priority, further in response to the first target value is zero, and further in response to the first forwarding action is the same as the second forwarding action; or
determine that a shielding anomaly occurs between the first rule and the third rule in response to the first initial priority being different from the first current priority, further in response to the first target value is zero, and further in response to the first forwarding action is different from the second forwarding action.

17. The rule detection apparatus according to claim 15, wherein the instructions, when executed by the at least one processor, further cause the apparatus to:
determine the fourth rule based on the fourth node, wherein the fourth node is a descendant node of the first node in the Hasse diagram data structure, and wherein a fourth current priority corresponding to the fourth node is higher than the first current priority; and
determine that a multi-rule shielding anomaly occurs between the first rule and the fourth rule.

18. The rule detection apparatus according to claim 15, wherein the instructions, when executed by the at least one processor, further cause the apparatus to:
obtain, based on a priority list, the first target value corresponding to the first initial priority, wherein the priority list comprises K initial priorities, K target values, and K nodes, wherein there are one-to-one correspondences between the initial priorities, the target values, and the K nodes, and wherein K is an integer greater than or equal to 1.

19. A rule detection apparatus, comprising:
at least one processor; and
one or more non-transitory computer readable memories coupled to the at least one processor and storing instructions that, when executed by the at least one processor, cause the apparatus to:

obtain a first rule for inclusion in an access control list;

obtain a first initial priority corresponding to the first rule, wherein the first rule corresponds to a first node in a Hasse diagram data structure, and wherein the first initial priority is stored in the first node;

obtain, from a second rule of the access control list, a second initial priority corresponding to a second node, wherein the second node is a parent node of the first node in the Hasse diagram data structure, and wherein the second node corresponds to the second rule;

determine a first target node based on the Hasse diagram data structure, wherein a current priority corresponding to the first target node is the same as the first initial priority;

obtain a first target value corresponding to the first initial priority by calculating a sum of packet space sizes corresponding to the first target node, wherein the packet space sizes corresponding to the first target node represent a quantity of non-overlapping elements between the first target node and a descendant node of the first target node;

determine, based on the first initial priority, the second initial priority, and the first target value, whether a rule anomaly occurs between the first rule and the second rule; and send an alarm to a user in response to determining that the rule anomaly has occurred, wherein the alarm provides rule anomaly information to the user.

20. The rule detection apparatus according to claim 19, wherein the instructions, when executed by the at least one processor, further cause the apparatus to:

determine that a rule anomaly occurs between the first rule and the second rule in response to the first initial priority being higher than the second initial priority.

* * * * *